(12) United States Patent
Sone et al.

(10) Patent No.: US 7,512,340 B2
(45) Date of Patent: Mar. 31, 2009

(54) OPTICAL NETWORK SYSTEM

(75) Inventors: Kyousuke Sone, Kawasaki (JP);
Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/216,706

(22) Filed: Jul. 9, 2008

(65) Prior Publication Data
US 2008/0273875 A1  Nov. 6, 2008

Related U.S. Application Data

(63) Continuation of application No. PCT/JP2006/300613, filed on Jan. 18, 2006.

(51) Int. Cl.
*H04B 10/00* (2006.01)
(52) U.S. Cl. .............................. 398/59; 398/48; 398/58
(58) Field of Classification Search .............. 398/58–73
See application file for complete search history.

(56) References Cited

U.S. PATENT DOCUMENTS

| 5,742,585 | A | 4/1998 | Yamamoto et al. |
| 6,538,782 | B1 | 3/2003 | Otsuka et al. |
| 6,611,638 | B2 | 8/2003 | Sakano |
| 2003/0138254 | A1 | 7/2003 | Otsuka et al. |

FOREIGN PATENT DOCUMENTS

EP  0 642 244 A2  3/1995

OTHER PUBLICATIONS

Patent Abstract of Japan, Japanese Publication No. 07-115429, Published May 2, 1995.
Patent Abstract of Japan, Japanese Publication No. 08-046613, Published Feb. 16, 1996.
Patent Abstract of Japan, Japanese Publication No. 09-023226, Published Jan. 21, 1997.
Patent Abstract of Japan, Japanese Publication No. 09-046364, Published Feb. 14, 1997.
Patent Abstract of Japan, Japanese Publication No. 2002-214473, Published Jul. 31, 2002.
Patent Abstract of Japan, Japanese Publication No. 11-218790, Published Aug. 10, 1999.
International Search Report mailed Apr. 18, 2006 in connection with the International application No. PCT/JP2006/300613.

*Primary Examiner*—Agustin Bello
(74) *Attorney, Agent, or Firm*—Staas & Halsey LLP

(57) ABSTRACT

An optical network system capable of directly routing optical signals without entailing multiple reception of identical wavelengths. A set wavelength output unit outputs a set wavelength. An $N_k$-axis filter receives an $N_k$-axis signal propagated through a ring of an $N_k$-axis direction and an $N_{k-1}$-axis signal split inside the local node, and performs filtering by removing a wavelength identical with that of the $N_{k-1}$-axis signal from the $N_k$-axis signal and adding the wavelength of the $N_{k-1}$-axis signal to the $N_k$-axis signal. An $N_k$-axis splitter splits the $N_k$-axis signal into two, one being output to outside through the ring of the $N_k$-axis direction while the other being output, if k<n, to a confluence with an $N_{k+1}$-axis signal, and, if k=n, to a wavelength separation filter. The filter separates a desired wavelength from the $N_k$-axis signal. Optical transmission media connect nodes so as to constitute an n-dimensional torus network.

9 Claims, 15 Drawing Sheets

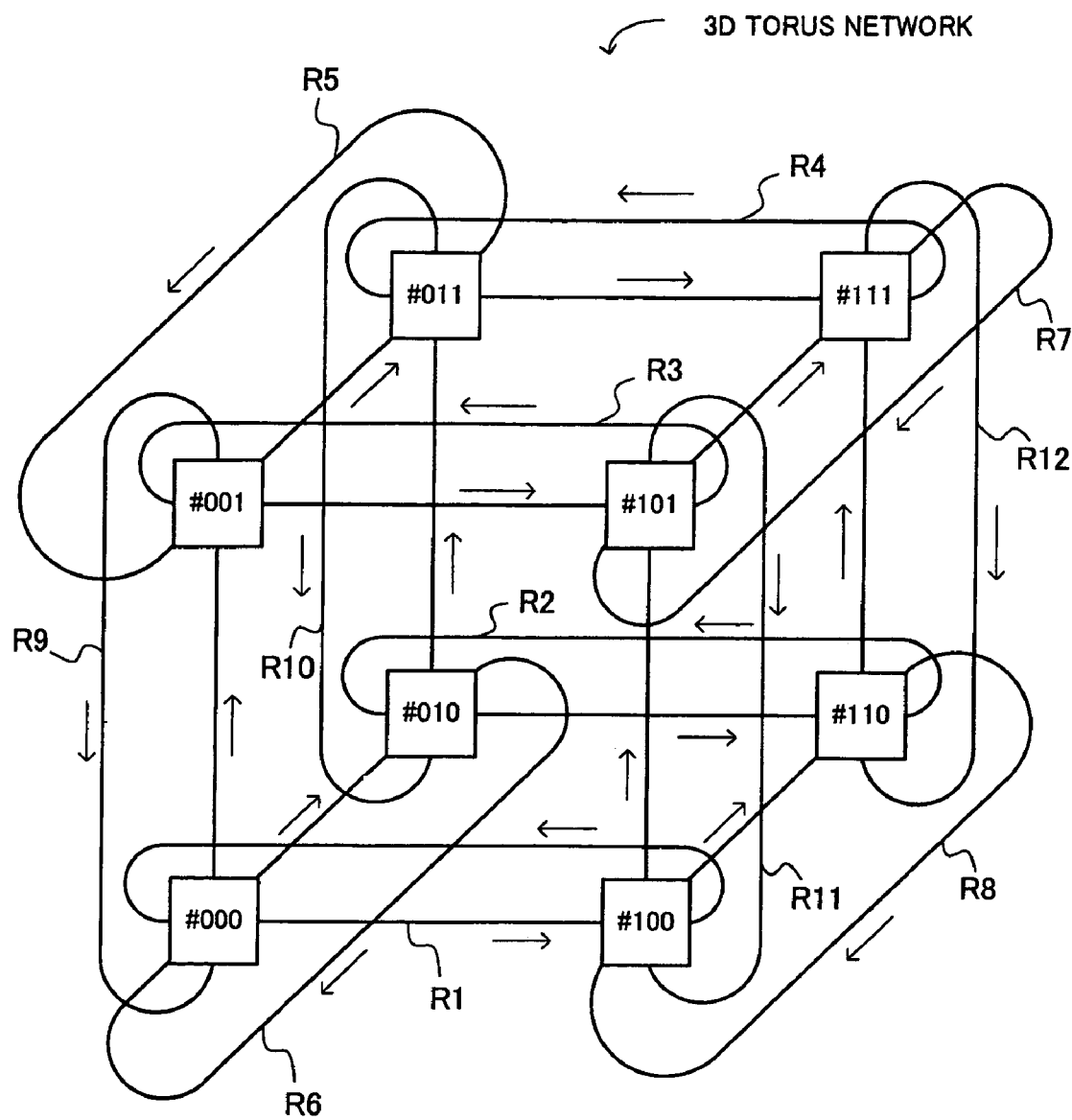
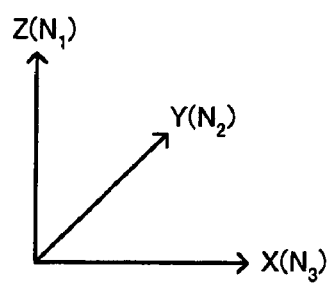
FIG. 4

T1 OPTICAL SIGNAL ROUTING TABLE
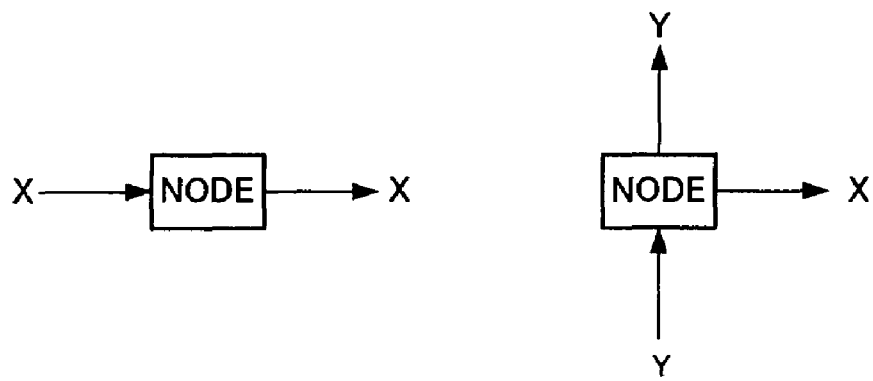
(Example) Paths of signal from #1
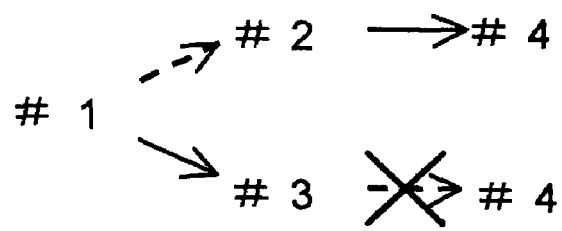
FIG. 6

T2 OPTICAL SIGNAL ROUTING TABLE
| In\Out | X | Y | Z |
|---|---|---|---|
| X | O | × | × |
| Y | O | O | × |
| Z | O | O | O |
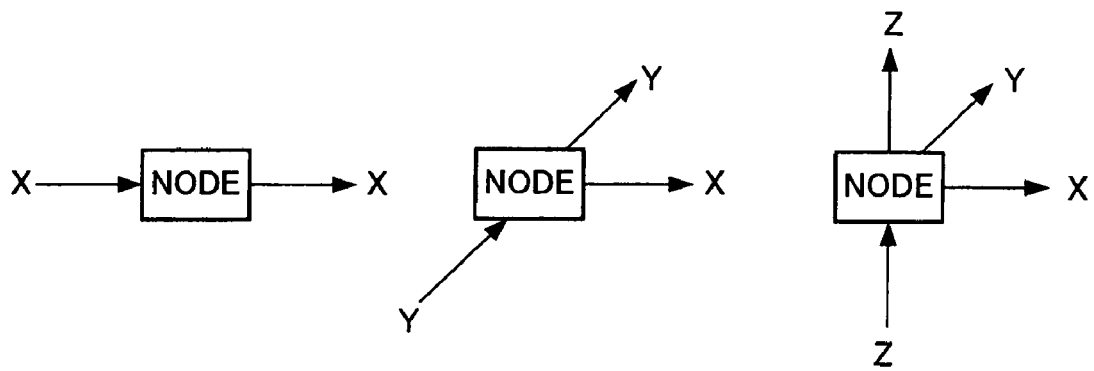
Paths of signal from #000.
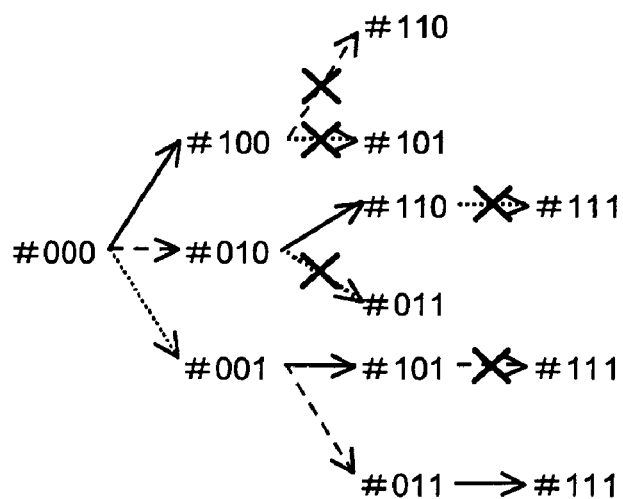
FIG. 10

OPTICAL NETWORK SYSTEM

This application is a continuing application, filed under 35 U.S.C. § 111(a), of International Application PCT/JP2006/300613, filed Jan. 18, 2006.

BACKGROUND OF THE INVENTION

1. Field of the Invention

The present invention relates to optical network systems, and more particularly, to an optical network system enabling a plurality of nodes to send/receive optical signals to/from one another.

2. Description of the Related Art

As a result of the recent advance in information communication networks, there has been an increasing demand for simultaneous logical or physical connections of numerous nodes on a network. In the case of a communication system called metro access network interconnecting nodes located in relatively near cities, for example, there has been a demand for schemes that logically combine individual nodes on the network together in the form of a mesh to allow each node to communicate with the other nodes.

A network enabling simultaneous communications of multiple nodes is called full mesh network and has hitherto been drawing attention in the fields of inter-office networking and grid computing as a low-cost, small-scale network permitting unbound communication between nodes.

In optical networks, on the other hand, WDM (Wavelength Division Multiplex) scheme has been advancing whereby multiple optical signals of different wavelengths are multiplexed and simultaneously transmitted over a single optical fiber. Also, for individual nodes on optical networks, increasing importance has been placed on the function as an OADM (Optical Add/Drop Multiplexer) for dropping/adding optical signals of specific wavelengths from/to a wavelength division multiplexed signal beam.

A technique to be applied to conventional optical networks has been proposed wherein a dielectric multilayer film is used as a filter for the splitter or coupler of a node, and fiber Bragg grating is employed in a split light leak shutoff section between the splitter and the coupler (e.g., Unexamined Japanese Patent Publication No. 2002-214473 (paragraph nos. [0014] to [0017], FIG. 1)).

In the case of directly routing optical signals by means of the OADM function without converting the optical signals to electrical signals, the optical signal output from a node is routed to propagate through multiple paths. In such cases, if identical optical signals propagated through different paths reach a certain node at the same time, then the node receives exactly the same optical signal in duplicate via different paths, which makes it impossible to carry out normal optical transmission.

FIG. 15 illustrates such duplicate reception of an optical signal. Nodes 101 to 104 are connected in the form of a mesh as shown in the figure. The node 101 generates an optical signal with a wavelength λa carrying certain information (information "a") (the optical signal with the wavelength λa is added to a wavelength division multiplexed (WDM) signal by the OADM). The signal multiplexed with the wavelength λa is routed directly without being converted to an electrical signal at individual nodes. Let us suppose that the wavelength division multiplexed signal is propagated through paths L1 and L2.

In this case, the node 103 receives, at the same time, the wavelength division multiplexed signal propagated through the path L1 and that propagated through the path L2, and these signals both contain the optical signal with the wavelength λa carrying the information "a" generated by the node 101, which means that exactly the same optical signal is received in duplicate via different paths. Consequently, interference occurs at the node 103, disrupting the communication.

When directly routing optical signals across an optical network, therefore, condition must be fulfilled that an optical signal generated by each node should be transmitted to all other nodes but there should not exist a node that receives, at the same time, identical optical signals propagated through different paths.

In the case of a simple network topology such as a one-dimensional ring network in which multiple nodes are connected in the form of a ring, a WDM optical signal is propagated in one direction, clockwise or counterclockwise. Thus, since a situation where a node receives the same signal in duplicate via different paths does not occur, optical signals can be directly routed. However, in the case of a more complex network topology, it is difficult to perform routing while satisfying the above condition.

Let us consider an exemplary case where an urban area mesh network is configured by an optical network using optical fibers and optical signals are directly routed across the optical network. In the mesh topology, however, each node receives optical signals from all directions, and accordingly, it is difficult to fulfill the condition that none of the nodes should receive the same optical signal in duplicate. A problem therefore arises in that complex network topology cannot be implemented in optical networks in which optical signals are directly routed.

In the case of an existing optical network with relatively complex topology, it is not possible to directly route optical signals across such a network while at the same time satisfying the condition that an optical signal should reach all nodes but no node should receive an identical optical signal in duplicate. In this case, it is necessary that each node perform electrical routing control. That is, optical signals need to be converted to electrical signals to allow destination search and the like to be conducted on the basis of the information indicated by the electrical signals, and then the electrical signals need to be again converted to optical signals, giving rise to a problem that restrictions are placed on the transmission characteristics that optical signals inherently have.

SUMMARY OF THE INVENTION

The present invention was created in view of the above circumstances, and an object thereof is to provide an optical network system which permits construction of an optical network having an n-dimensional torus topology and capable of directly routing optical signals without entailing duplicate or multiple reception of identical optical signals, thereby enhancing the operability of optical communications.

To achieve the object, there is provided an optical network system enabling a plurality of nodes to send/receive optical signals to/from one another. The optical network system comprises a plurality of optical transmission nodes to which respective different wavelengths are allocated, and optical transmission media forming a plurality of rings of respective different $N_m$-axis directions (m=1, 2, ..., n) and connecting the optical transmission nodes so as to constitute an n-dimensional torus network. Each optical transmission node includes an $N_1$-axis processor, an $N_k$-axis processor, and a wavelength separation filter. The $N_1$-axis processor includes a set wavelength output unit for outputting a set wavelength allocated to a local node, an $N_1$-axis filter for receiving an $N_1$-axis optical signal output from a different node and propagated through a ring of an $N_1$-axis direction, and performing filtering by removing a wavelength identical with the set wavelength from the $N_1$-axis optical signal and adding the set wavelength to the $N_1$-axis optical signal to generate a new $N_1$-axis optical signal, and an $N_1$-axis splitter for splitting the $N_1$-axis optical signal generated by the $N_1$-axis filter in two directions such that one split $N_1$-axis optical signal is output to outside through the ring of the $N_1$-axis direction while the other split $N_1$-axis optical signal is output to a point of confluence with an $N_2$-axis optical signal propagated inside the local node through a ring of an $N_2$-axis direction. The $N_k$-axis processor includes an $N_k$-axis filter serving as a confluence point where an $N_k$-axis optical signal propagated through a ring of an $N_k$-axis direction (k=2, 3, . . . , n) joins an $N_{k-1}$-axis optical signal propagated through a ring of an $N_{k-1}$-axis direction, the $N_k$-axis filter receiving the $N_k$-axis optical signal output from a different node and propagated through the ring of the $N_k$-axis direction and the $N_{k-1}$-axis optical signal split inside the local node, and performing filtering by removing a wavelength identical with that of the $N_{k-1}$-axis optical signal from the $N_k$-axis optical signal and adding the wavelength of the $N_{k-1}$-axis optical signal to the $N_k$-axis optical signal to generate a new $N_k$-axis optical signal, and an $N_k$-axis splitter for splitting the $N_k$-axis optical signal generated by the $N_k$-axis filter in two directions such that one split $N_k$-axis optical signal is output to outside through the ring of the $N_k$-axis direction while the other split $N_k$-axis optical signal is output, if k<n, to a point of confluence with an $N_{k+1}$-axis optical signal propagated inside the local node through a ring of an $N_{k+1}$-axis direction, and, if k=n, to a location of wavelength separation. The wavelength separation filter receives the $N_k$-axis optical signal output from the $N_k$-axis splitter and separates a desired wavelength from the received signal.

Also, to achieve the above object, there is provided an optical network system enabling a plurality of nodes to send/receive optical signals to/from one another. The optical network system comprises a plurality of optical transmission nodes to which respective different wavelengths are allocated, and optical transmission media forming rings of respective different X- and Y-axis directions and connecting the optical transmission nodes so as to constitute a two-dimensional torus network. Each optical transmission node includes a Y-axis processor, an X-axis processor, and a wavelength separation filter. The Y-axis processor includes a set wavelength output unit for outputting a set wavelength allocated to a local node, a Y-axis filter for receiving a Y-axis optical signal output from a different node and propagated through the ring of the Y-axis direction, and performing filtering by removing a wavelength identical with the set wavelength from the Y-axis optical signal and adding the set wavelength to the Y-axis optical signal to generate a new Y-axis optical signal, and a Y-axis splitter for splitting the Y-axis optical signal generated by the Y-axis filter in two directions such that one split Y-axis optical signal is output to outside through the ring of the Y-axis direction while the other split Y-axis optical signal is output to a point of confluence with an X-axis optical signal propagated inside the local node through the ring of the X-axis direction. The X-axis processor includes an X-axis filter serving as the confluence point where the X-axis optical signal propagated through the ring of the X-axis direction joins the Y-axis optical signal propagated through the ring of the Y-axis direction, the X-axis filter receiving the X-axis optical signal output from a different node and propagated through the ring of the X-axis direction and the Y-axis optical signal split inside the local node, and performing filtering by removing a wavelength identical with that of the Y-axis optical signal from the X-axis optical signal and adding the wavelength of the Y-axis optical signal to the X-axis optical signal to generate a new X-axis optical signal, and an X-axis splitter for splitting the X-axis optical signal generated by the X-axis filter in two directions such that one split X-axis optical signal is output to outside through the ring of the X-axis direction while the other split X-axis optical signal is output to a location of wavelength separation. The wavelength separation filter receives the X-axis optical signal output from the X-axis splitter and separates a desired wavelength from the received signal.

Further, to achieve the above object, there is provided an optical network system enabling a plurality of nodes to send/receive optical signals to/from one another. The optical network system comprises a plurality of optical transmission nodes to which respective different wavelengths are allocated, and optical transmission media forming rings of respective different X-, Y- and Z-axis directions and connecting the optical transmission nodes so as to constitute a three-dimensional torus network. Each optical transmission node includes a Z-axis processor, a Y-axis processor, an X-axis processor, and a wavelength separation filter. The Z-axis processor includes a set wavelength output unit for outputting a set wavelength allocated to a local node, a Z-axis filter for receiving a Z-axis optical signal output from a different node and propagated through the ring of the Z-axis direction, and performing filtering by removing a wavelength identical with the set wavelength from the Z-axis optical signal and adding the set wavelength to the Z-axis optical signal to generate a new Z-axis optical signal, and a Z-axis splitter for splitting the Z-axis optical signal generated by the Z-axis filter in two directions such that one split Z-axis optical signal is output to outside through the ring of the Z-axis direction while the other split Z-axis optical signal is output to a point of confluence with a Y-axis optical signal propagated inside the local node through the ring of the Y-axis direction. The Y-axis processor includes a Y-axis filter serving as the confluence point where the Y-axis optical signal propagated through the ring of the Y-axis direction joins the Z-axis optical signal propagated through the ring of the Z-axis direction, the Y-axis filter receiving the Y-axis optical signal output from a different node and propagated through the ring of the Y-axis direction and the Z-axis optical signal split inside the local node, and performing filtering by removing a wavelength identical with that of the Z-axis optical signal from the Y-axis optical signal and adding the wavelength of the Z-axis optical signal to the Y-axis optical signal to generate a new Y-axis optical signal, and a Y-axis splitter for splitting the Y-axis optical signal generated by the Y-axis filter in two directions such that one split Y-axis optical signal is output to outside through the ring of the Y-axis direction while the other split Y-axis optical signal is output to a point of confluence with an X-axis optical signal propagated inside the local node through the ring of the X-axis direction. The X-axis processor includes an X-axis filter serving as the confluence point where the X-axis optical signal propagated through the ring of the X-axis direction joins the Y-axis optical signal propagated through the ring of the Y-axis direction, the X-axis filter receiving the X-axis optical signal output from a different node and propagated through the ring of the X-axis direction and the Y-axis optical signal split inside the local node, and performing filtering by removing a wavelength identical with that of the Y-axis optical signal from the X-axis optical signal and adding the wavelength of the Y-axis optical signal to the X-axis optical signal to generate a new X-axis optical signal, and an X-axis splitter for splitting the X-axis optical signal generated by the X-axis filter in two directions such that one split X-axis optical signal is output to outside through the ring of the X-axis direction while the other split X-axis optical signal is output to a location of wavelength separation. The wavelength separation filter receives the X-axis optical signal output from the X-axis splitter and separates a desired wavelength from the received signal.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 illustrates the structure of still another torus network.
FIG. 6 shows an optical signal routing table.
FIG. 10 shows an optical signal routing table.

DESCRIPTION OF THE PREFERRED EMBODIMENTS

Figure 1:
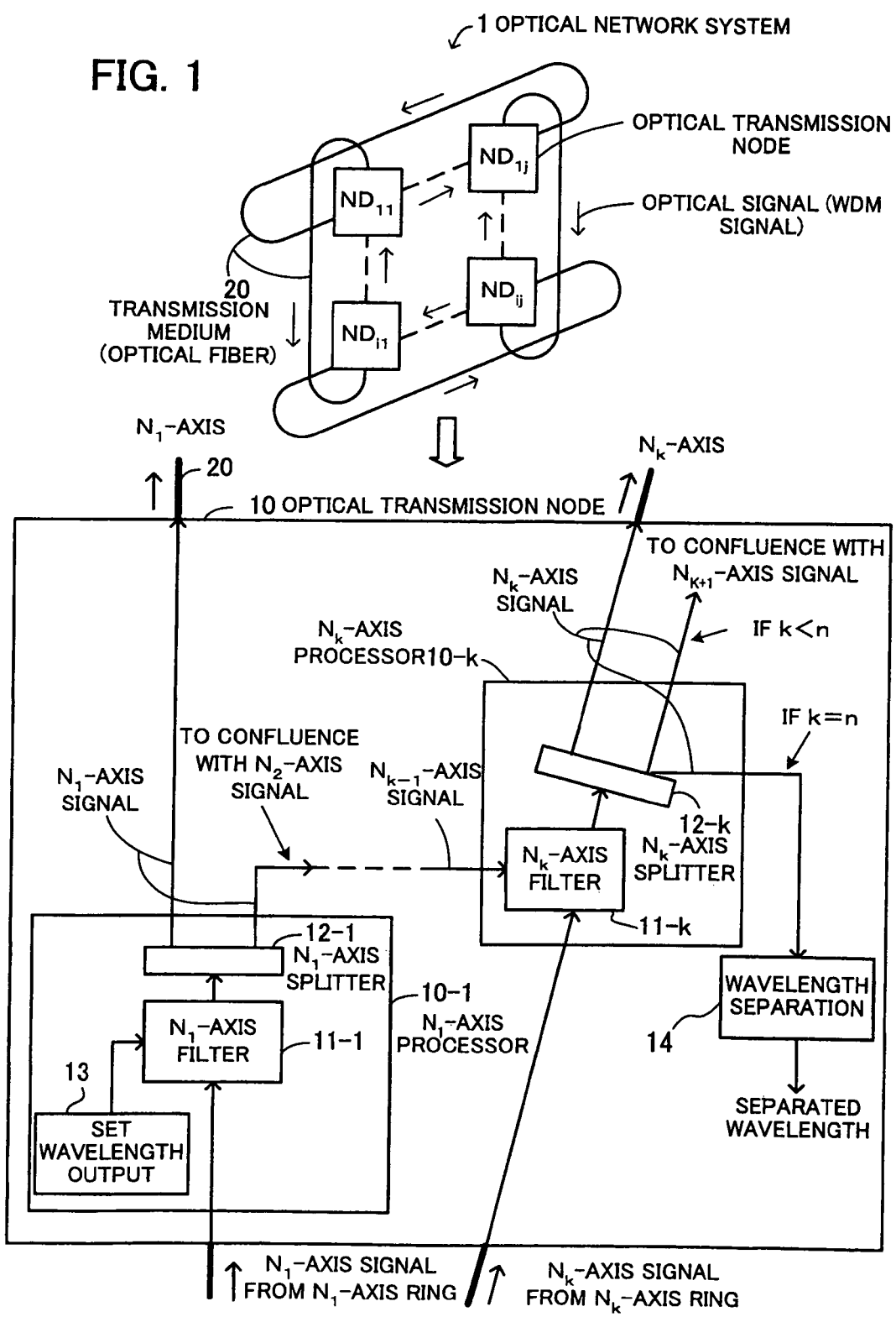
FIG. 1 illustrates the principle of an optical network system.

Preferred embodiments of the present invention will be described below with reference to the accompanying drawings, wherein like reference numerals refer to like elements throughout. FIG. 1 illustrates the principle of an optical network system. The optical network system 1 is a network system constituted by a plurality of optical transmission nodes 10 and having an n-dimensional torus (ring) network topology resembling a mesh topology.

Figure 2:
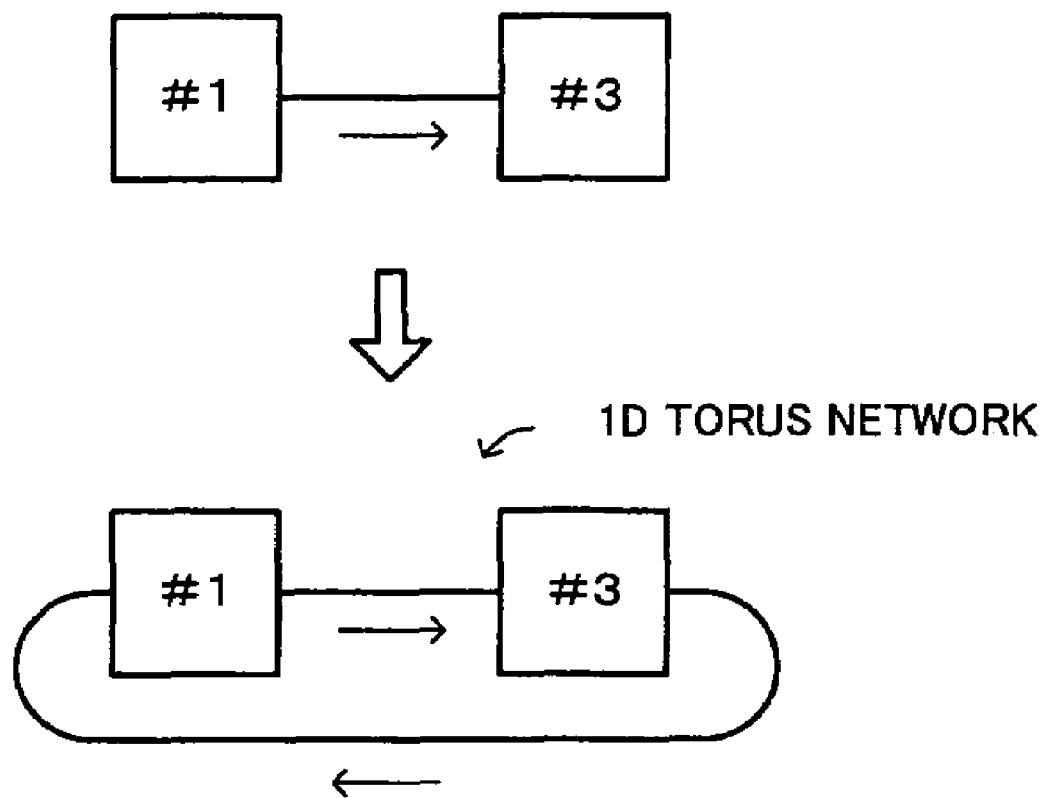
FIG. 2 illustrates the structure of a torus network.

FIG. 1 shows an example of how a two-dimensional torus network is configured by a plurality of optical transmission nodes $ND_{11}$ to $ND_{ij}$ and optical transmission media (optical fiber cables) 20 (torus network structures will be described later with reference to FIGS. 2 to 4).

Each optical transmission node 10 comprises an $N_1$-axis processor 10-1, an $N_k$-axis processor 10-$k$, and a wavelength separation filter 14. The direction of an optical signal propagated through each ring interconnecting the optical transmission nodes 10 is represented by $N_m$-axis (m=1, 2, ..., n) (the axis will be explained later with reference to FIGS. 2 to 4).

The $N_1$-axis processor 10-1 includes a set wavelength output unit 13, an $N_1$-axis filter 11-1, and an $N_1$-axis splitter 12-1. The optical transmission nodes 10 are allocated respective different wavelengths, and the set wavelength output unit 13 outputs the set wavelength allocated to the local node (set wavelength carries service information).

Where the optical network system includes four optical transmission nodes 10, for example, the four nodes are allocated respective different wavelengths λ1 to λ4. In the optical transmission node 10 to which the wavelength λ1 is allocated, the set wavelength output unit 13 outputs the wavelength λ1, and in the optical transmission node 10 to which the wavelength λ2 is allocated, the set wavelength output unit 13 outputs the wavelength λ2.

The $N_1$-axis filter 11-1 receives an $N_1$-axis optical signal which was output from a different optical transmission node and has been propagated through a ring of an $N_1$-axis direction (the optical signal propagated through each ring is a wavelength division multiplexed (WDM) signal on which one or more wavelengths are multiplexed). Then, the $N_1$-axis filter 11-1 performs filtering by removing a wavelength identical with the set wavelength from the $N_1$-axis optical signal and adding the set wavelength to the $N_1$-axis optical signal, to generate a new $N_1$-axis optical signal (this function is equivalent to the Add function of an OADM).

Suppose, for example, that the wavelength λ1 (referred to as old wavelength λ1 for ease of understanding) is multiplexed on the $N_1$-axis optical signal propagated through the ring of the $N_1$-axis direction and that the set wavelength output unit 13 outputs the wavelength λ1 (referred to as new wavelength λ1 for ease of understanding). In this case, the $N_1$-axis filter 11-1 removes the old wavelength λ1 from the $N_1$-axis optical signal and adds, to the $N_1$-axis optical signal, the new wavelength λ1 allocated to the local node, thereby generating a new $N_1$-axis optical signal. Namely, the wavelength λ1 carrying old service information is replaced by the wavelength λ1 carrying new service information.

The $N_1$-axis splitter (optical coupler) 12-1 splits the $N_1$-axis optical signal generated by the $N_1$-axis filter 11-1 in two directions. One split $N_1$-axis optical signal is output to the outside through the ring of the $N_1$-axis direction. Namely, this split $N_1$-axis optical signal is transmitted to another optical transmission node through the ring of the $N_1$-axis direction.

The other split $N_1$-axis optical signal is output to a confluence point where the split signal meets an $N_2$-axis optical signal propagated inside the local node through a ring of an $N_2$-axis direction (the confluence point corresponds to an $N_2$-axis filter).

The $N_k$-axis processor 10-$k$ includes an $N_k$-axis filter 11-$k$ and an $N_k$-axis splitter 12-$k$. The $N_k$-axis filter 11-$k$ serves as a confluence point where an $N_k$-axis optical signal propagated through a ring of an $N_k$-axis direction (k=2, 3, ..., n) joins an $N_{k-1}$-axis optical signal propagated through a ring of an $N_{k-1}$-axis direction.

The $N_k$-axis filter 11-$k$ receives the $N_k$-axis optical signal that was output from a different node and has been propagated through the ring of the $N_k$-axis direction as well as the $N_{k-1}$-axis optical signal split inside the local node, and performs filtering by removing the same wavelength as that of the $N_{k-1}$-axis optical signal from the $N_k$-axis optical signal and adding the wavelength of the $N_{k-1}$-axis optical signal to the $N_k$-axis optical signal, to generate a new $N_k$-axis optical signal (the basic operation of the $N_k$-axis filter 11-$k$ is identical with that of the $N_1$-axis filter 11-1).

The $N_k$-axis splitter (optical coupler) 12-$k$ splits the $N_k$-axis optical signal generated by the $N_k$-axis filter 11-$k$ in two directions. One split $N_k$-axis optical signal is output to the outside via the ring of the $N_k$-axis direction. Namely, this split $N_k$-axis optical signal is transmitted to another optical transmission node through the ring of the $N_k$-axis direction.

If k<n, it means that there is an axis or axes (ring or rings) extending in a different direction or directions. Accordingly, the other split $N_k$-axis optical signal is output to the confluence point where the split signal meets an $N_{k+1}$-axis optical signal propagated inside the local node through a ring of an $N_{k+1}$-axis direction. That is, the split $N_k$-axis optical signal is output to an $N_{k+1}$-axis filter. On the other hand, if k=n, then it means that the final filtering has been performed. Since there is no other axis (ring) extending in a different direction, the split $N_k$-axis optical signal is output to a location of wavelength separation (wavelength separation filter 14).

The wavelength separation filter 14 receives the $N_k$-axis optical signal output from the $N_k$-axis splitter 12-k, and separates a desired wavelength from the received signal (this function is equivalent to the Drop function of an OADM).

The optical transmission media (optical fiber cables) 20 form the rings of respective different $N_m$-axis directions (m=1, 2, . . . , n) and connect the optical transmission nodes 10 so as to constitute an n-dimensional torus network.

Where an n-dimensional torus network is configured by rings of $N_m$-axis directions (m=1, 2, . . . , n), the paths of optical signals propagated through the network are determined as stated below, because of the aforementioned configuration of the optical transmission nodes 10.

For m=1, the optical signal input from the ring of the $N_1$-axis direction is output in all n directions starting from the ring of the $N_1$-axis direction to the ring of the $N_n$-axis direction. For $2 \leq m \leq n$, the optical signal input from the ring of the $N_m$-axis direction is output in m directions starting from the ring of the $N_1$-axis direction to the ring of the $N_m$-axis direction, and for m=n, the optical signal input from the ring of the $N_n$-axis direction is output only to the ring of the $N_n$-axis direction.

Conversely, in order for the optical signals to propagate through the torus network along such paths, it is necessary that the optical transmission nodes 10 should have the configuration illustrated in FIG. 1 (details of the optical signal paths in two- and three-dimensional torus networks will be described later with reference to FIGS. 5, 6, 9 and 10).

Torus networks will be now explained. FIGS. 2 to 4 illustrate torus network structures, wherein the thin arrows indicate the flows of optical signals. Nodes #1 and #3 linearly connected with each other by an optical fiber, as shown in FIG. 2, are reconfigured so as to be connected in a ring, whereupon the nodes #1 and #3 constitute a one-dimensional (1D) torus network. The one-dimensional torus network is identical with a commonly known ring network (the optical network system 1 of the present invention is applied to a two- or higher-dimensional torus network).

Figure 3:
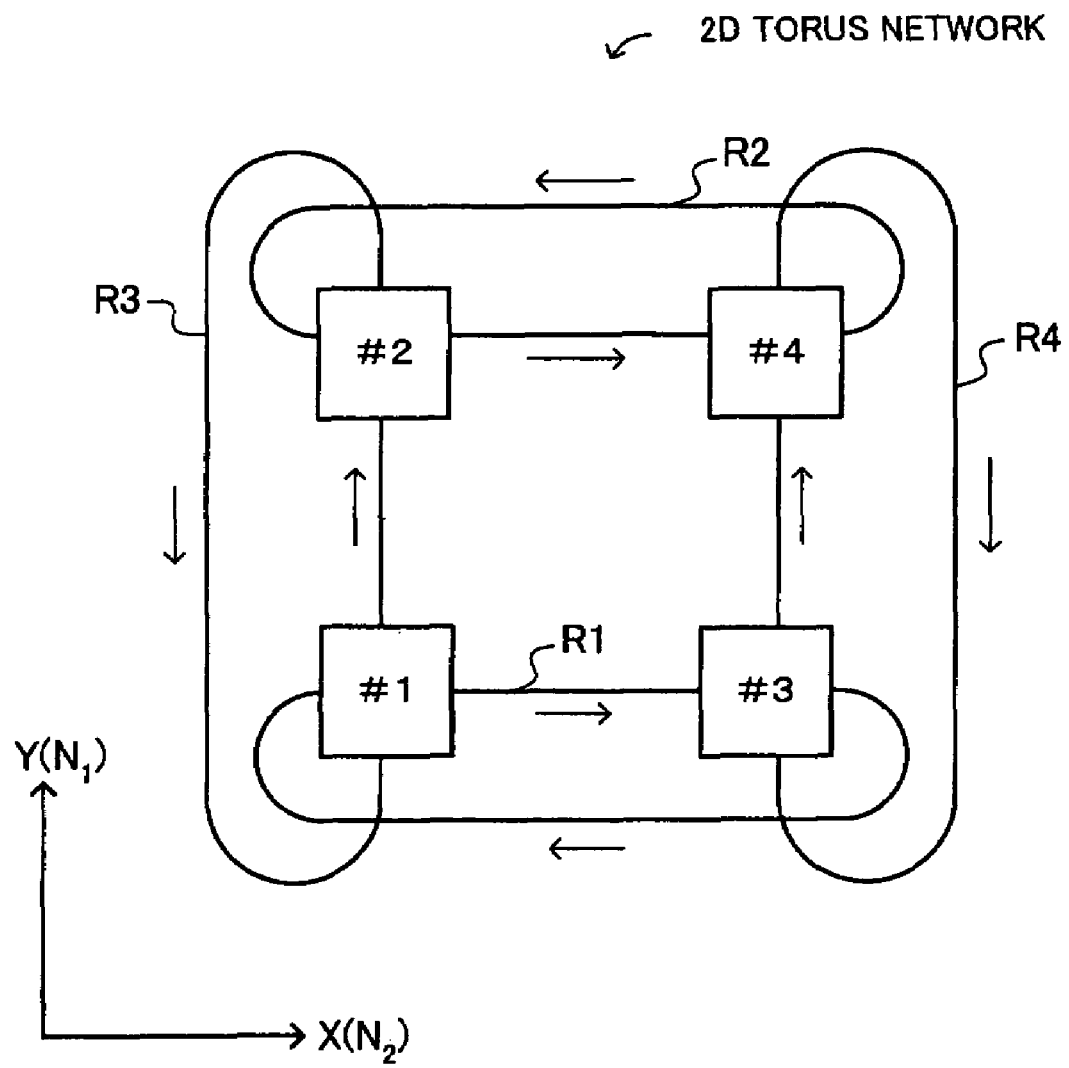
FIG. 3 illustrates the structure of another torus network.

FIG. 3 shows a two-dimensional (2D) torus network constituted by four nodes #1 to #4, by way of example. The nodes #1 and #3 are interconnected by a ring R1, the nodes #2 and #4 are interconnected by a ring R2, the nodes #1 and #2 are interconnected by a ring R3, and the nodes #3 and #4 are interconnected by a ring R4. A topology like this is called two-dimensional torus network. The rings R1 and R2 are defined as rings in an X-axis direction ($N_2$-axis direction), and the rings R3 and R4 are defined as rings in a Y-axis direction ($N_1$-axis direction).

FIG. 4 shows a three-dimensional (3D) torus network constituted by eight nodes #000 to #111, by way of example. The nodes #000 and #100 are interconnected by a ring R1, the nodes #010 and #110 are interconnected by a ring R2, the nodes #001 and #101 are interconnected by a ring R3, and the nodes #011 and #111 are interconnected by a ring R4.

Also, the nodes #001 and #011 are interconnected by a ring R5, the nodes #000 and #010 are interconnected by a ring R6, the nodes #101 and #111 are interconnected by a ring R7, and the nodes #100 and #110 are interconnected by a ring R8.

Further, the nodes #001 and #000 are interconnected by a ring R9, the nodes #011 and #010 are interconnected by a ring R10, the nodes #101 and #100 are interconnected by a ring R11, and the nodes #111 and #110 are interconnected by a ring R12.

A topology like this is called three-dimensional torus network. The rings R1 to R4 are defined as rings in an X-axis direction ($N_3$-axis direction), the rings R5 to R8 are defined as rings in a Y-axis direction ($N_2$-axis direction), and the rings R9 to R12 are defined as rings in a Z-axis direction ($N_1$-axis direction). Nodes are connected in like manner in n dimensions to configure an n-dimensional torus network.

Taking an exemplary case where the optical network system 1 is applied to a two-dimensional torus network, the network configuration and the configuration and operation of the optical transmission nodes 10 will be now described in detail. First, the configuration of a two-dimensional torus network and the paths of optical signals across the two-dimensional torus network will be explained with reference to FIGS. 5 and 6.

Figure 5:
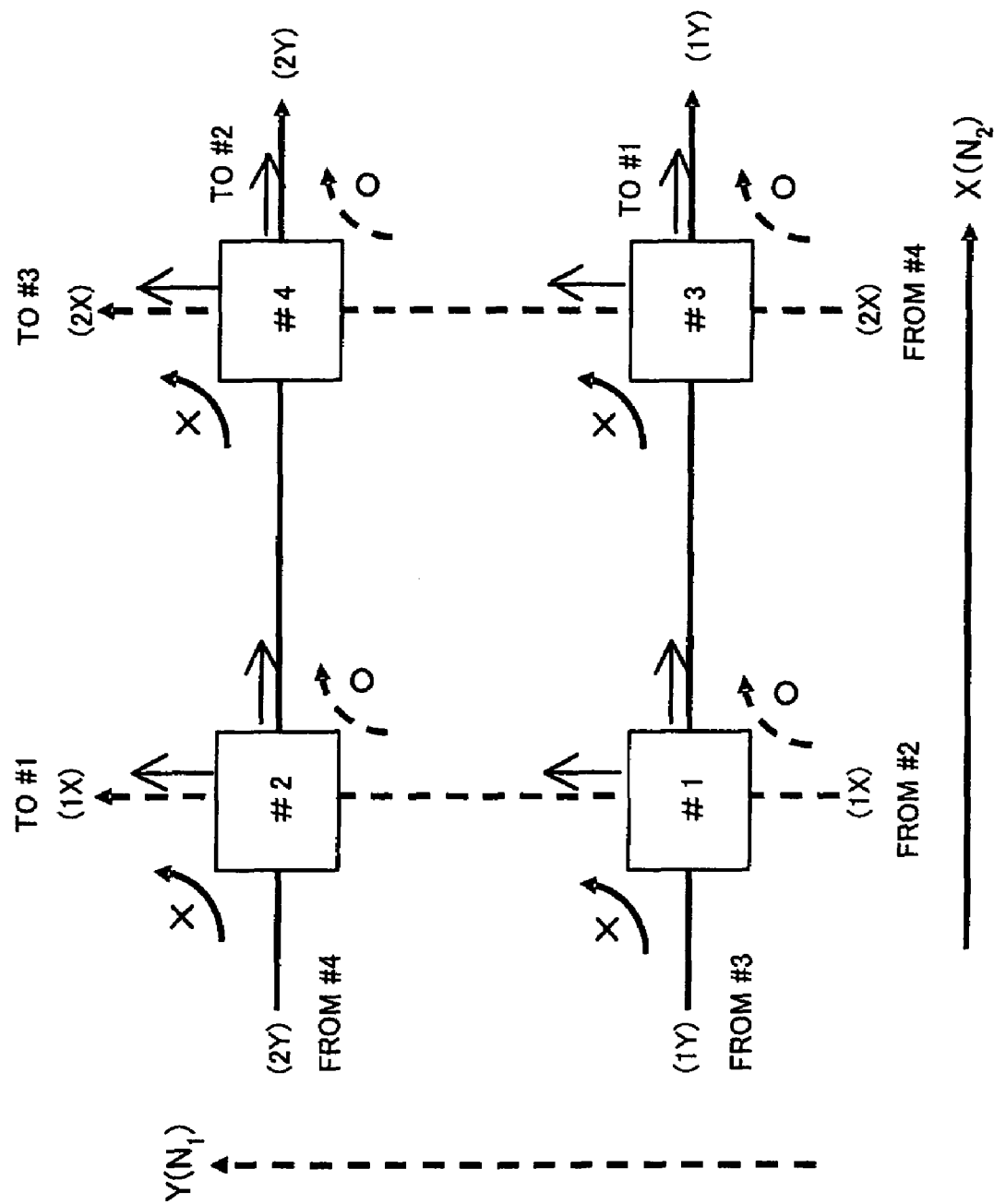
FIG. 5 shows an exemplary configuration of a two-dimensional torus network.

FIG. 5 exemplifies the configuration of a two-dimensional torus network, and FIG. 6 shows an optical signal routing table. In the following, where one node is connected with n rings of respective different directions (the nodes form an n-dimensional structure) and has $p_n$ ports per ring in one direction, the n-dimensional torus network is expressed as $p_1 \times p_2 \times \ldots \times p_n$.

Accordingly, the network illustrated in FIG. 5 is a 2×2 torus network constituted by the nodes #1 to #4 (one node is connected two-dimensionally with a ring of the X-axis direction and a ring of the Y-axis direction, and therefore, $p_1 \times p_2$, and since there are two, input and output ports per ring in one direction, 2×2). In the figure, the optical fibers interconnecting the nodes are not illustrated in ring form for simplicity's sake. Also, out of the fibers indicated individually by two symbols in parentheses, those with the same symbols are connected to each other.

In the network of FIG. 5, each node is connected with two input lines (each node has two input ports). Thus, since there is a possibility that identical optical signals propagated through different paths will reach a certain node at the same time, it is necessary to ensure that no node receives the same signal in duplicate. It is also necessary that optical signals be equally distributed to all nodes #1 to #4. Accordingly, the paths of optical signals need to be set so that no node may receive the same wavelength in duplicate and also that optical signals may be distributed to all nodes #1 to #4.

In the case of FIG. 5, duplicate reception of an optical signal can be avoided by laying down the rule that the optical signal input from the X-axis direction is output only in the X-axis direction, and the rule that the optical signal input from the Y-axis direction is output in both the X- and Y-axis directions.

The rules are defined in the optical signal routing table T1 shown in FIG. 6. In the table T1, the upper left circle "o" indicates that the optical signal input from the X-axis is output to the X-axis, the upper right cross "x" indicates that the optical signal input from the X-axis is not output to the Y-axis, the lower left circle "o" indicates that the optical signal input from the Y-axis is output to the X-axis, and the lower right circle "o" indicates that the optical signal input from the Y-axis is output to the Y-axis.

As a specific example, let us consider an optical signal added to the node #1. The optical signal added to the node #1 from the Y-axis direction is output in both the X- and Y-axis directions and, therefore, reaches the nodes #2 and #3. In accordance with the routing rules, the optical signal is thereafter propagated from the node #2 to the node #4, but not from the node #3 to the node #4. Consequently, duplicate reception of the optical signal does not occur, and yet the optical signal is distributed to all nodes. In torus network configurations, the individual nodes are in symmetric relation, and accordingly, the above applies to all nodes.

The concept of optical signal routing for the n-dimensional torus network, described above with reference to FIG. 1, will be now correlated with the two-dimensional torus network shown in FIG. 5. For an n-dimensional torus network with rings in $N_m$-axis directions (m=1, 2, n), n=2 and m=1, 2 stand in this case, and therefore, the network configured is a two-dimensional torus network with rings in $N_1$- (Y-) and $N_2$- (X-)axis directions. For m=1, the optical signal input from the ring of the $N_1$-(Y-) axis direction is output in two directions through the rings of the $N_1$- (Y-) and $N_2$- (X-)axis directions, and for m=2, the optical signal input from the ring of the $N_2$-(X-) axis direction is output only to the ring of the $N_2$-(X-) axis direction.

Figure 7:
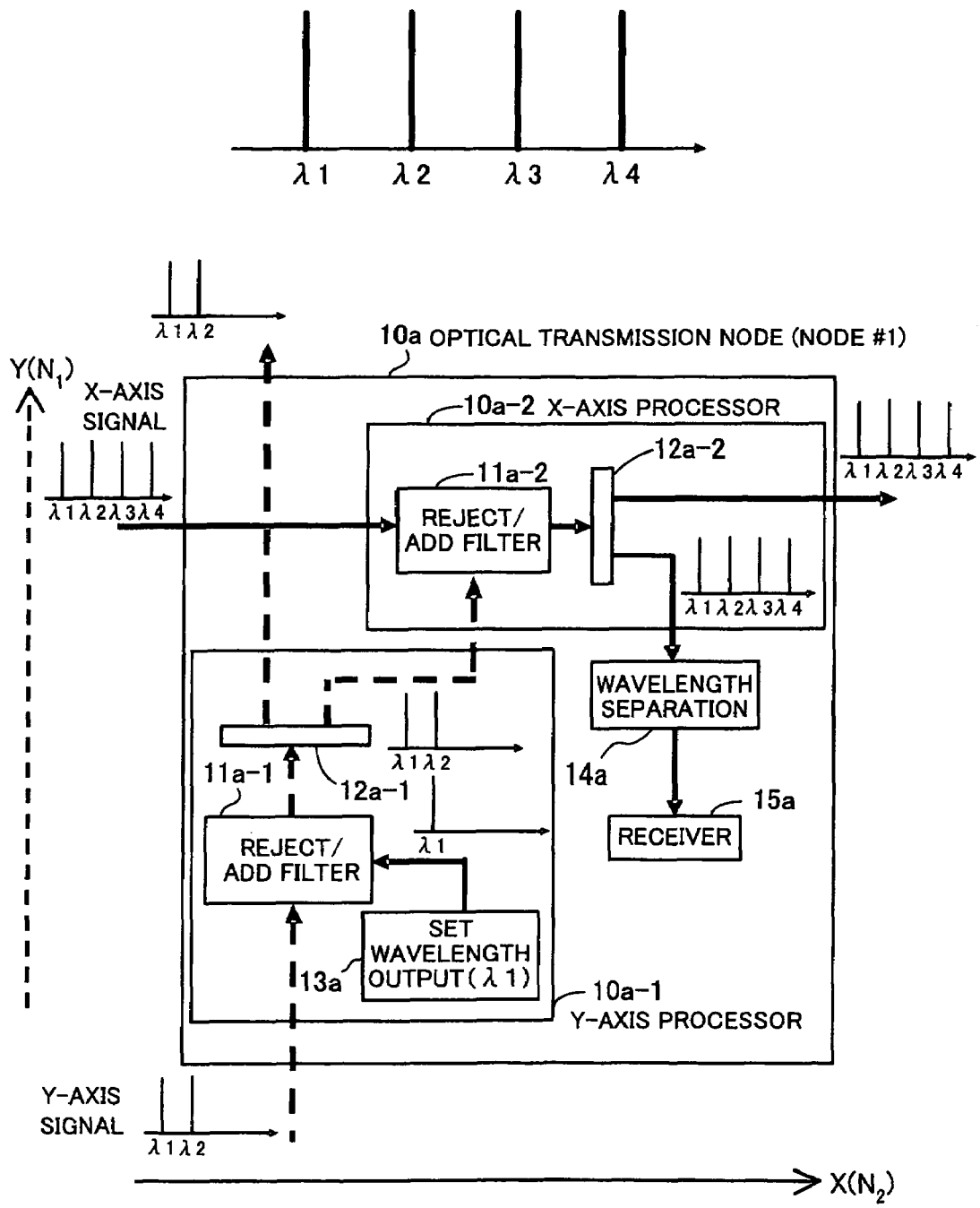
FIG. 7 shows the configuration of an optical transmission node in the two-dimensional torus network.

The configuration of the optical transmission node 10 constituting the two-dimensional torus network of FIG. 5 will be now described with reference to FIG. 7. The nodes #1 to #4 each have a configuration identical with that of the illustrated optical transmission node 10a. Since the nodes #1 to #4 are allocated respective different wavelengths λ1 to λ4, however, the set wavelength output unit 13 in each node outputs the wavelength allocated to the local node. The following description is based on the assumption that the optical transmission node 10a of FIG. 7 is the node #1 to which the wavelength λ1 is allocated.

The optical transmission node 10a comprises a Y-axis ($N_1$-axis) processor 10a-1, an X-axis ($N_2$-axis) processor 10a-2, a wavelength separation filter 14a, and a receiver 15a.

The symbol "k" in the term "$N_k$-axis" represents 2, 3, . . . , n, and since the network configuration is two-dimensional in this instance, n=2, and therefore, k=2. Accordingly, the $N_k$-axis is the $N_2$-axis, which corresponds to the X-axis as shown in FIG. 3. Also, as shown in FIG. 3, the $N_1$-axis corresponds to the Y-axis.

The Y-axis processor 10a-1 includes a set wavelength output unit 13a, a rejection-and-add filter 11a-1 (corresponding to the Y-axis filter), and a Y-axis splitter 12a-1. The X-axis processor 10a-2 includes a rejection-and-add filter 11a-2 (corresponding to the X-axis filter), and an X-axis splitter 12a-2.

The set wavelength output unit 13a outputs the set wavelength λ1 allocated to the local node. The rejection-and-add filter 11a-1 receives a Y-axis optical signal which was output from a different node (node #2) and has been propagated through the ring of the Y-axis direction and on which the wavelengths λ1 and λ2 are multiplexed, and performs filtering by removing the same wavelength as the set wavelength λ1 from the Y-axis optical signal and then adding the set wavelength to the Y-axis optical signal.

Specifically, the rejection-and-add filter 11a-1 removes the wavelength λ1 from the Y-axis optical signal propagated through the ring of the Y-axis direction, and adds, to the Y-axis optical signal, the wavelength λ1 output from the set wavelength output unit 13a, thereby generating a new Y-axis optical signal.

The Y-axis splitter 12a-1 splits the Y-axis optical signal generated by the rejection-and-add filter 11a-1 into two. One split Y-axis optical signal is output to the outside (to the node #2) through the ring of the Y-axis direction. The Y-axis splitter 12a-1 outputs the other split Y-axis optical signal to a point of confluence with an X-axis optical signal propagated through the ring of the X-axis direction, namely, to the rejection-and-add filter 11a-2 in the X-axis processor 10a-2.

The rejection-and-add filter 11a-2 serves as the confluence point where the X-axis optical signal propagated through the ring of the X-axis direction joins the Y-axis optical signal propagated through the ring of the Y-axis direction. Specifically, the filter 11a-2 receives the X-axis optical signal which was output from a different node (node #3) and has been propagated through the ring of the X-axis direction and on which the wavelengths λ1 to λ4 are multiplexed, as well as the Y-axis optical signal which has been split inside the local node and on which the wavelengths λ1 and λ2 are multiplexed, and performs filtering by removing the same wavelengths as those of the Y-axis optical signal from the X-axis optical signal and then adding the wavelengths of the Y-axis optical signal to the X-axis optical signal.

Namely, the wavelengths λ1 and λ2 are removed from the X-axis optical signal propagated through the ring of the X-axis direction, and the wavelengths λ1 and λ2 output from the Y-axis splitter 12a-1 are added to the X-axis optical signal, thereby generating a new X-axis optical signal on which the wavelengths λ1 to λ4 are multiplexed.

The X-axis splitter 12a-2 splits the X-axis optical signal (wavelengths λ1 to λ4) generated by the rejection-and-add filter 11a-2 into two. One split X-axis optical signal is output to the outside (to the node #3) through the ring of the X-axis direction. The X-axis splitter 12a-2 outputs the other split X-axis optical signal to the wavelength separation filter 14a.

The wavelength separation filter 14a receives the X-axis optical signal output from the X-axis splitter 12a-2 and separates a desired wavelength from the received signal. Since the wavelengths λ1 to λ4 are multiplexed on the X-axis optical signal, the wavelength separation filter 14a may extract and separate a desired wavelength from among the wavelengths λ1 to λ4 to be output. The receiver 15a receives the separated wavelength and also transmits the output from the wavelength separation filter 14a to the tributary connected to the node #1.

Figure 8:
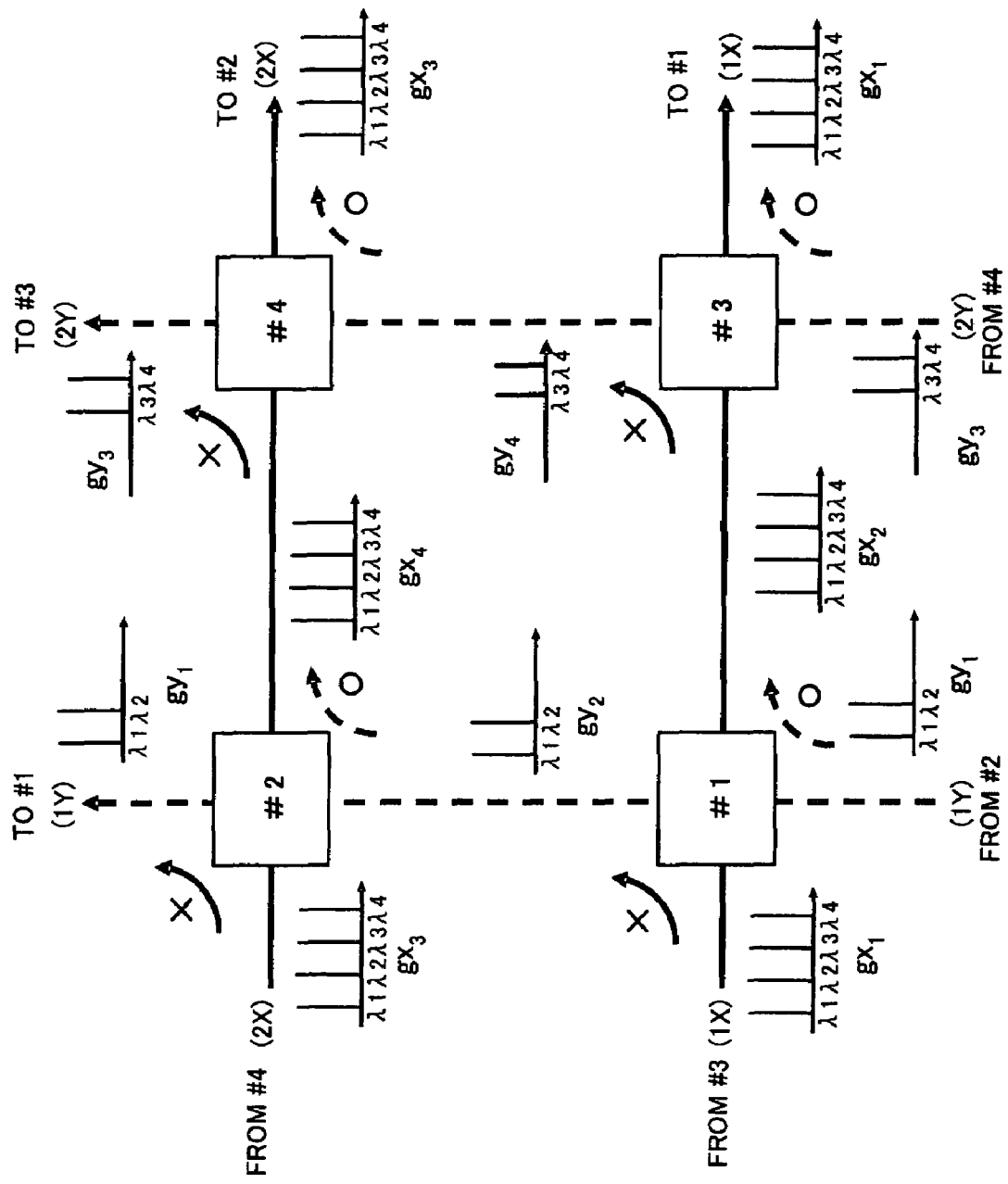
FIG. 8 shows how optical signals are propagated.

The flows of optical signals will be now explained with reference to FIG. 8. The figure illustrates flows of wavelength groups of the wavelength division multiplexed signals (WDM signals) generated by the nodes #1 to #4 through OADM.

As stated above with reference to FIG. 7, the node #1 receives a wavelength group (λ1, λ2) $gy_1$ transmitted from the node #2, replaces the wavelength λ1 in the wavelength group (λ1, λ2) $gy_1$ with the set wavelength λ1 of the local node #1 to generate a wavelength group (λ1, λ2) $gy_2$, and outputs the generated wavelength group to the node #2.

Also, the node #1 receives a wavelength group (λ1 to λ4) $gx_1$ transmitted from the node #3 as stated above with reference to FIG. 7, then replaces the wavelengths λ1 and λ2 in the wavelength group (λ1 to λ4) $gx_1$ with the wavelengths λ1 and λ2 of the wavelength group $gy_2$ to generate a wavelength group (λ1 to λ4) $gx_2$, and outputs the generated wavelength group to the node #3.

The node #2 receives the wavelength group (λ1, λ2) $gy_2$ transmitted from the node #1, then replaces the wavelength λ2 in the wavelength group (λ1, λ2) $gy_2$ with the set wavelength λ2 of the local node #2 to generate a wavelength group (λ1, λ2) $gy_1$, and outputs the generated wavelength group to the node #1.

Also, the node #2 receives a wavelength group (λ1 to λ4) $gx_3$ transmitted from the node #4, then replaces the wavelengths λ1 and λ2 in the wavelength group (λ1 to λ4) $gx_3$ with the wavelengths λ1 and λ2 of the wavelength group $gy_1$ to generate a wavelength group (λ1 to λ4) $gx_4$, and outputs the generated wavelength group to the node #4.

The node #3 receives a wavelength group (λ3, λ4) gy₃ transmitted from the node #4, then replaces the wavelength λ3 in the wavelength group (λ3, λ4) gy₃ with the set wavelength λ3 of the local node #3 to generate a wavelength group (λ3, λ4) gy₄, and outputs the generated wavelength group to the node #4.

Also, the node #3 receives the wavelength group (λ1 to λ4) gx₂ transmitted from the node #1, then replaces the wavelengths λ3 and λ4 in the wavelength group (λ1 to λ4) gx₂ with the wavelengths λ3 and λ4 of the wavelength group gy₄ to generate a wavelength group (λ1 to λ4) gx₁, and outputs the generated wavelength group to the node #1.

The node #4 receives the wavelength group (λ3, λ4) gy₄ transmitted from the node #3, then replaces the wavelength λ4 in the wavelength group (λ3, λ4) gy₄ with the set wavelength λ4 of the local node #4 to generate a wavelength group (λ3, λ4) gy₃, and outputs the generated wavelength group to the node #3.

Also, the node #4 receives the wavelength group (λ1 to λ4) gx₄ transmitted from the node #2, then replaces the wavelengths λ3 and λ4 in the wavelength group (λ1 to λ4) gx₄ with the wavelengths λ3 and λ4 of the wavelength group gy₃ to generate a wavelength group (λ1 to λ4) gx₃, and outputs the generated wavelength group to the node #2.

Thus, in order to realize the two-dimensional torus configuration, each node uses two rejection-and-add filters. The rejection-and-add filter on the Y-axis rejects, from the Y-axis optical signal, only the wavelength that is to be added by the local node, and adds the set wavelength to the Y-axis optical signal (in the above example, the set wavelength is one in number, but a plurality of set wavelengths may be added at each node).

On the other hand, the rejection-and-add filter on the X-axis rejects, from the X-axis optical signal, the wavelengths that are added by all nodes on the Y-axis on which the local node is located, and adds the wavelengths to the X-axis optical signal. The wavelength division multiplexed signal propagated along the Y-axis is split by the optical coupler in each node, and a split signal is added to the X-axis optical signal by the rejection-and-add filter on the X-axis. The wavelength division multiplexed signal propagated along the X-axis is kept from entering the Y-axis. This configuration enables the optical signals to propagate in conformity with the routing rules illustrated in FIG. 6.

Taking an exemplary case where the optical network system 1 is applied to a three-dimensional torus network, the network configuration and the configuration and operation of the optical transmission nodes 10 will be now described in detail. First, the configuration of a three-dimensional torus network and the paths of optical signals across the three-dimensional torus network will be explained with reference to FIGS. 9 and 10.

Figure 9:
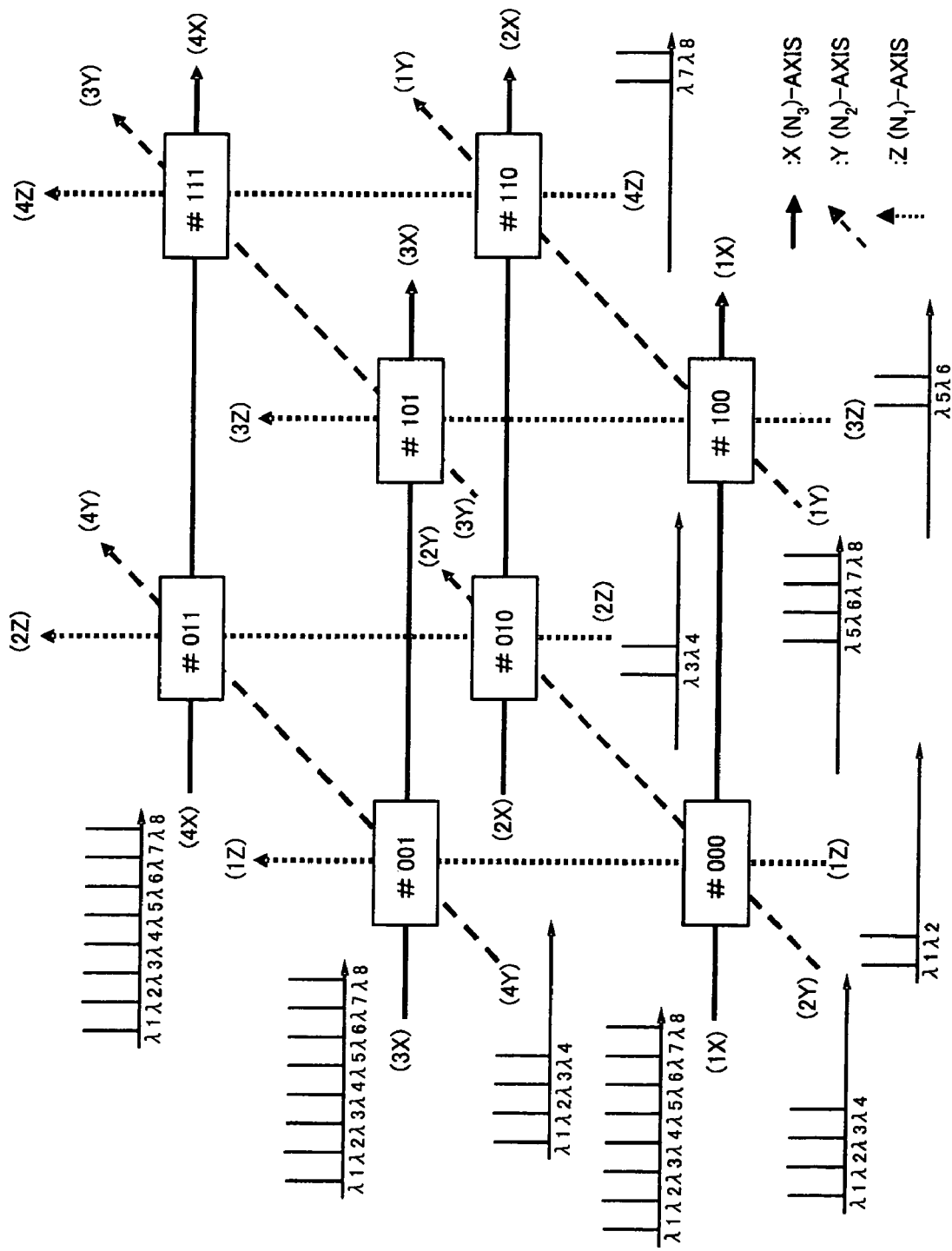
FIG. 9 shows an exemplary configuration of a three-dimensional torus network.

FIG. 9 exemplifies the configuration of a three-dimensional torus network, and FIG. 10 shows an optical signal routing table. The network illustrated in FIG. 9 is a 2×2×2 torus network constituted by the nodes #000 to #111 (one node is connected three-dimensionally with rings in the X-, Y- and Z-axis directions, and therefore, p₁×p₂×p₃, and since there are two, input and output ports per ring in one direction, 2×2×2). In the figure, the optical fibers interconnecting the nodes are not illustrated in ring form for simplicity's sake. Also, out of the fibers indicated individually by two symbols in parentheses, those with the same symbols are connected to each other.

In the network of FIG. 9, each node is connected with three input lines (each node has three input ports). Thus, since there is a possibility that identical optical signals propagated through different paths will reach a certain node at the same time, it is necessary to ensure that no node receives the same signal multiple times. It is also necessary that optical signals be equally distributed to all nodes #000 to #111. Accordingly, the optical signal paths need to be set so that no node may receive the same wavelength multiple times and also that optical signals may be distributed to all nodes #000 to #111.

In the case of FIG. 9, multiple reception of an optical signal can be avoided by laying down the rule that the optical signal input from the X-axis direction is output only in the X-axis direction, the rule that the optical signal input from the Y-axis direction is output in both the X- and Y-axis directions, and the rule that the optical signal input from the Z-axis direction is output in all the X-, Y- and Z-axis directions.

The rules are defined in the optical signal routing table T2 shown in FIG. 10. In the table T2, the circle "o" in the row "X" indicates that the optical signal input from the X-axis is output to the X-axis, the two crosses "x" in the row "X" indicate that the optical signal input from the X-axis is not output to the X- or Y-axis, the two circles "o" in the row "Y" indicate that the optical signal input from the Y-axis is output to both the X- and Y-axes, the cross "x" in the row "Y" indicates that the optical signal input from the Y-axis is not output to the Z-axis, and the three circles "o" in the row "Z" indicate that the optical signal input from the Z-axis is output to all of the X-, Y- and Z-axes.

As a specific example, let us consider an optical signal added to the node #000. The optical signal added to the node #000 from the Z-axis direction is output in the three X-, Y- and Z-axis directions and, therefore, reaches the nodes #001, #010, and #100.

In accordance with the routing rules, the optical signal is thereafter propagated from the node #001 to the nodes #011 and #101. The optical signal is propagated from the node #010 to the node #110 but not to the node #011. The optical signal is not propagated from the node #100 to the node #110 or #101.

The optical signal is propagated from the node #011 to the node #111, but not from the node #101 or #110 to the node #111. Consequently, multiple reception of the optical signal does not occur, and yet the optical signal is distributed to all nodes. In torus network configurations, the individual nodes are in symmetric relation, and accordingly, the above applies to all nodes.

The concept of optical signal routing for the n-dimensional torus network, described above with reference to FIG. 1, will be now correlated with the three-dimensional torus network shown in FIG. 9. For an n-dimensional torus network with rings in $N_m$-axis directions (m=1, 2, ..., n), n=3 and m=1, 2, 3 stand in this case, and therefore, the network configured is a three-dimensional torus network with rings in $N_1$-(Z-), $N_2$-(Y-), and $N_3$-(X-)axis directions. For m=1, the optical signal input from the ring of the $N_1$-(Z-)axis direction is output in three directions through the rings of the $N_1$-(Z-), $N_2$-(Y-), and $N_3$-(X-)axis directions, and for m=2, the optical signal input from the ring of the $N_2$-(Y-)axis direction is output in two directions through the rings of the $N_2$-(Y-) and $N_3$-(X-)axis directions. For m=3, the optical signal input from the ring of the $N_3$-(X-)axis direction is output only to the ring of the $N_3$-(X-)axis direction.

Figure 11:
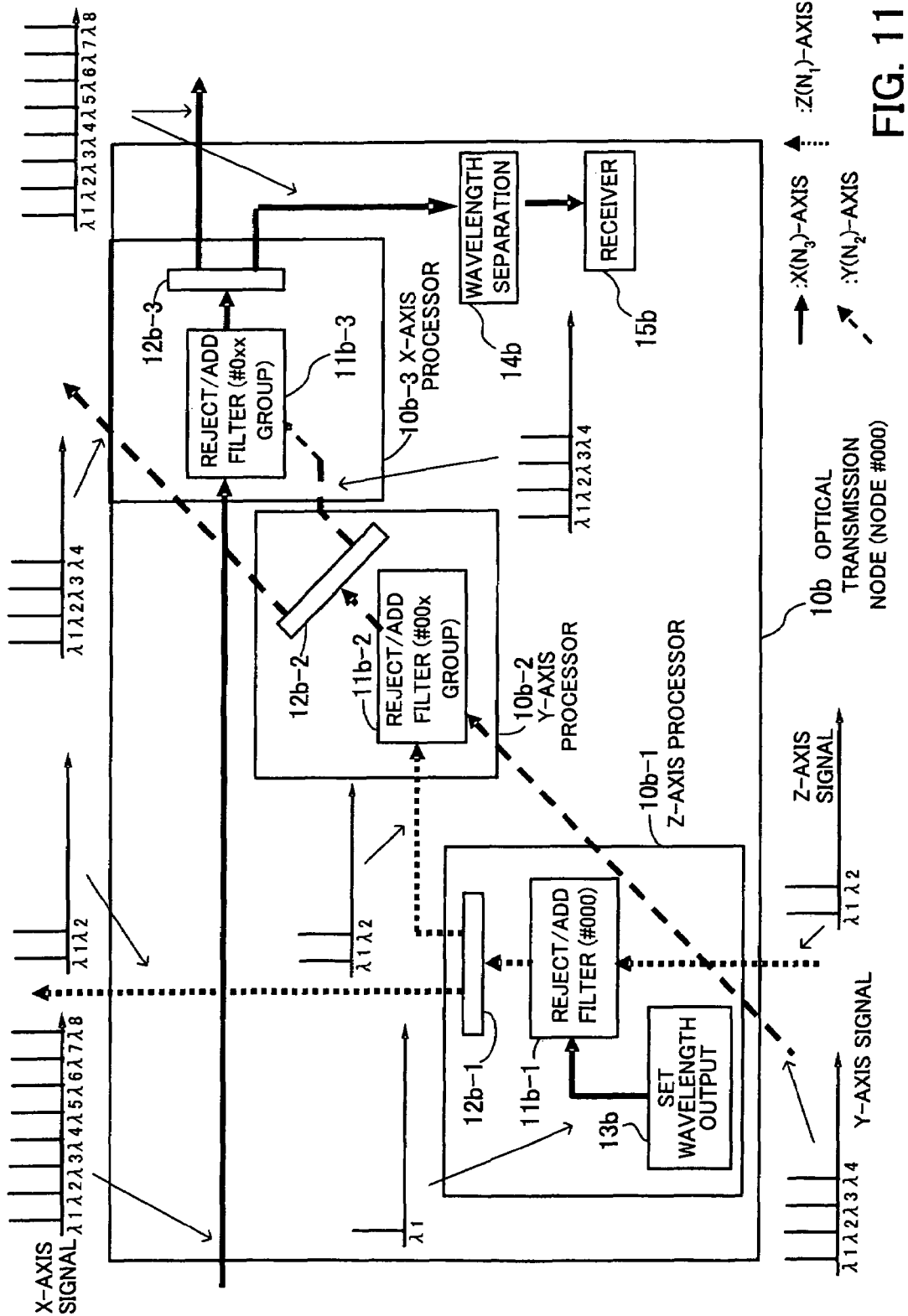
FIG. 11 shows the configuration of an optical transmission node in the three-dimensional torus network.

The configuration of the optical transmission node 10 constituting the three-dimensional torus network of FIG. 9 will be now described with reference to FIG. 11. The nodes #000 to #111 each have a configuration identical with that of the illustrated optical transmission node 10b. Since the nodes #000 to #111 are allocated respective different wavelengths λ1 to λ8, however, the set wavelength output unit 13b in each node outputs the wavelength allocated to the local node. The following description is based on the assumption that the optical transmission node 10*b* of FIG. 11 is the node #000 to which the wavelength λ1 is allocated.

The optical transmission node 10*b* comprises a Z-axis ($N_1$-axis) processor 10*b*-1, a Y-axis ($N_2$-axis) processor 10*b*-2, an X-axis ($N_3$-axis) processor 10*b*-3, a wavelength separation filter 14*b*, and a receiver 15*b*.

The symbol "k" in the term "$N_k$-axis" represents 2, 3, ..., n, and since the network configuration is three-dimensional in this instance, n=3, and therefore, k=2, 3. Accordingly, the $N_k$-axis represents the $N_2$- and $N_3$-axes, which correspond to the Y- and X-axes, respectively, as shown in FIG. 4. Also, as shown in FIG. 4, the $N_1$-axis corresponds to the Z-axis.

The Z-axis processor 10*b*-1 includes a set wavelength output unit 13*b*, a rejection-and-add filter 11*b*-1 (corresponding to the Z-axis filter), and a Z-axis splitter 12*b*-1. The Y-axis processor 10*b*-2 includes a rejection-and-add filter 11*b*-2 (corresponding to the Y-axis filter), and a Y-axis splitter 12*b*-2. The X-axis processor 10*b*-3 includes a rejection-and-add filter 11*b*-3 (corresponding to the X-axis filter), and an X-axis splitter 12*b*-3.

The set wavelength output unit 13*b* outputs the set wavelength λ1 allocated to the local node. The rejection-and-add filter 11*b*-1 receives a Z-axis optical signal which was output from a different node (node #001) and has been propagated through the ring of the Z-axis direction and on which the wavelengths λ1 and λ2 are multiplexed, and performs filtering by removing the same wavelength as the set wavelength λ1 from the Z-axis optical signal and then adding the set wavelength to the Z-axis optical signal.

Specifically, the wavelength λ1 is removed from the Z-axis optical signal propagated through the ring of the Z-axis direction, and the wavelength λ1 output from the set wavelength output unit 13*b* is added to the Z-axis optical signal, thereby generating a new Z-axis optical signal.

The Z-axis splitter 12*b*-1 splits the Z-axis optical signal generated by the rejection-and-add filter 11*b*-1 into two. One split Z-axis optical signal is output to the outside (to the node #001) through the ring of the Z-axis direction. The Z-axis splitter 12*b*-1 outputs the other split Z-axis optical signal to a point of confluence with a Y-axis optical signal propagated through the ring of the Y-axis direction, namely, to the rejection-and-add filter 11*b*-2 in the Y-axis processor 10*b*-2.

The rejection-and-add filter 11*b*-2 serves as the confluence point where the Z-axis optical signal propagated through the ring of the Z-axis direction joins the Y-axis optical signal propagated through the ring of the Y-axis direction. Specifically, the filter 11*b*-2 receives the Y-axis optical signal which was output from a different node (node #010) and has been propagated through the ring of the Y-axis direction and on which the wavelengths λ1 to λ4 are multiplexed, as well as the Z-axis optical signal which has been split inside the local node and on which the wavelengths λ1 and λ2 are multiplexed, and performs filtering by removing the same wavelengths as those of the Z-axis optical signal from the Y-axis optical signal and then adding the wavelengths of the Z-axis optical signal to the Y-axis optical signal.

Namely, the wavelengths λ1 and λ2 are removed from the Y-axis optical signal propagated through the ring of the Y-axis direction, and the wavelengths λ1 and λ2 output from the Z-axis splitter 12*b*-1 are added to the Y-axis optical signal, thereby generating a new Y-axis optical signal on which the wavelengths λ1 to λ4 are multiplexed.

The Y-axis splitter 12*b*-2 splits the Y-axis optical signal (wavelengths λ1 to λ4) generated by the rejection-and-add filter 11*b*-2 into two. One split Y-axis optical signal is output to the outside (to the node #010) through the ring of the Y-axis direction. The Y-axis splitter 12*b*-2 outputs the other split Y-axis optical signal to a point of confluence with an X-axis optical signal propagated through the ring of the X-axis direction, namely, to the rejection-and-add filter 11*b*-3 in the X-axis processor 10*b*-3.

The rejection-and-add filter 11*b*-3 functions as the confluence point where the X-axis optical signal propagated through the ring of the X-axis direction joins the Y-axis optical signal propagated through the ring of the Y-axis direction. Specifically, the filter 11*b*-3 receives the X-axis optical signal which was output from a different node (node #100) and has been propagated through the ring of the X-axis direction and on which the wavelengths λ1 to λ8 are multiplexed, as well as the Y-axis optical signal which has been split inside the local node and on which the wavelengths λ1 to λ4 are multiplexed, and performs filtering by removing the same wavelengths as those of the Y-axis optical signal from the X-axis optical signal and then adding the wavelengths of the Y-axis optical signal to the X-axis optical signal.

Namely, the wavelengths λ1 to λ4 are removed from the X-axis optical signal propagated through the ring of the X-axis direction, and the wavelengths λ1 to λ4 output from the Y-axis splitter 12*b*-2 are added to the X-axis optical signal, thereby generating a new X-axis optical signal on which the wavelengths λ1 to λ8 are multiplexed.

The X-axis splitter 12*b*-3 splits the X-axis optical signal (wavelengths λ1 to λ8) generated by the rejection-and-add filter 11*b*-3 into two. One split X-axis optical signal is output to the outside (to the node #100) through the ring of the X-axis direction. The X-axis splitter 12*b*-3 outputs the other split X-axis optical signal to the wavelength separation filter 14*b*.

The wavelength separation filter 14*b* receives the X-axis optical signal output from the X-axis splitter 12*b*-3 and separates a desired wavelength from the received signal. Since the wavelengths λ1 to λ8 are multiplexed on the X-axis optical signal, the wavelength separation filter 14*b* may extract and separate a desired wavelength from among the wavelengths λ1 to λ8 to be output. The receiver 15*b* receives the separated wavelength and also transmits the output from the wavelength separation filter 14*b* to the tributary connected to the node #000.

Figure 12:
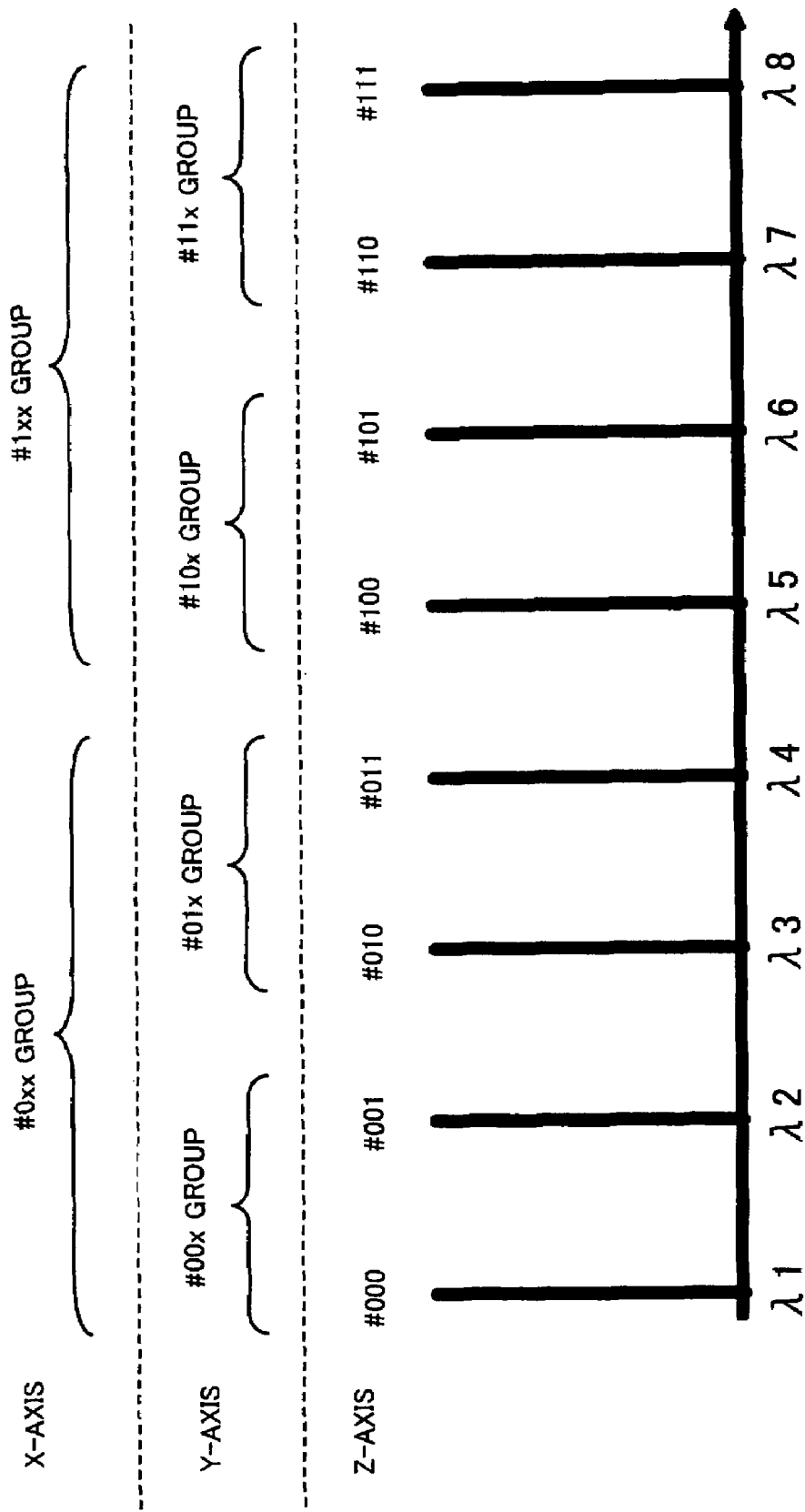
FIG. 12 shows how wavelengths are allocated in the three-dimensional torus network.

FIG. 12 illustrates the wavelength allocation of the three-dimensional torus network. On the Z-axis, the wavelengths λ1 to λ8 are added by the respective nodes #000 to #111. At the nodes #000 and #001 forming the #00*x* group, the wavelengths λ1 and λ2 are added to the Y-axis. At the nodes #010 and #011 forming the #01*x* group, the wavelengths λ3 and λ4 are added to the Y-axis, and at the nodes #100 and #101 forming the #10*x* group, the wavelengths λ5 and λ6 are added to the Y-axis. At the nodes #110 and #111 forming the #11*x* group, the wavelengths λ7 and λ8 are added to the Y-axis.

Further, at the nodes #000, #001, #010 and #011 forming the #0*xx* group, the wavelengths λ1 to λ4 are added to, the X-axis, and at the nodes #100, #101, #110 and #111 forming the #1*xx* group, the wavelengths λ5 to λ8 are added to the X-axis.

Thus, in order to realize the three-dimensional torus configuration, each node uses three rejection-and-add filters. The rejection-and-add filter on the Z-axis rejects, from the Z-axis optical signal, only the set wavelength that is to be added by the local node, and adds the set wavelength to the Z-axis optical signal (in the above example, the set wavelength is one in number, but a plurality of set wavelengths may be added at each node).

On the other hand, the rejection-and-add filter on the Y-axis rejects, from the Y-axis optical signal, the wavelength group that are added by all nodes on the Z-axis on which the local node is located, that is, in the case of the node #000, the wavelength group #00x, and adds the wavelengths to the Y-axis optical signal.

Further, the rejection-and-add filter on the X-axis rejects, from the X-axis optical signal, the wavelength group that are added by all nodes on the Y-axis on which the local node is located, that is, in the case of the node #000, the wavelength group #0xx, and adds the wavelengths to the X-axis optical signal.

The wavelength division multiplexed signal propagated through each node along the Z-axis is split by the optical coupler, and a split signal is added to the Y-axis optical signal by the rejection-and-add filter on the Y-axis. Further, the signal propagated along the Y-axis is also split by the optical coupler, and a split signal is added to the X-axis optical signal by the rejection-and-add filter on the X-axis. The wavelength division multiplexed signal propagated along the X-axis is kept from entering the Y- and Z-axes, and the wavelength division multiplexed signal propagated along the Y-axis is kept from entering the Z-axis. This node configuration enables the optical signals to propagate in conformity with the routing rules illustrated in FIG. 10.

Figure 13:
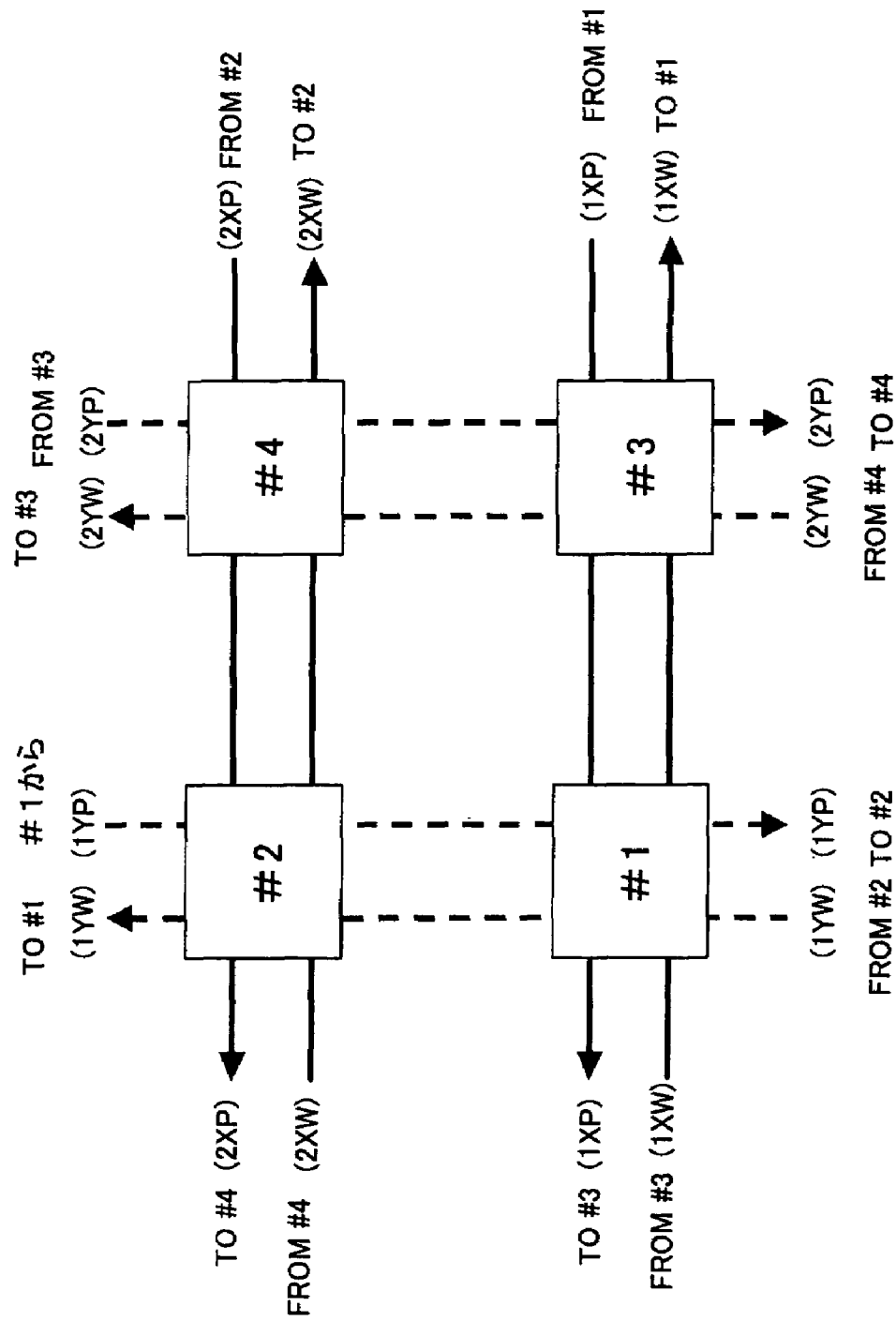
FIG. 13 shows an exemplary configuration of a redundant optical network system.
Figure 14:
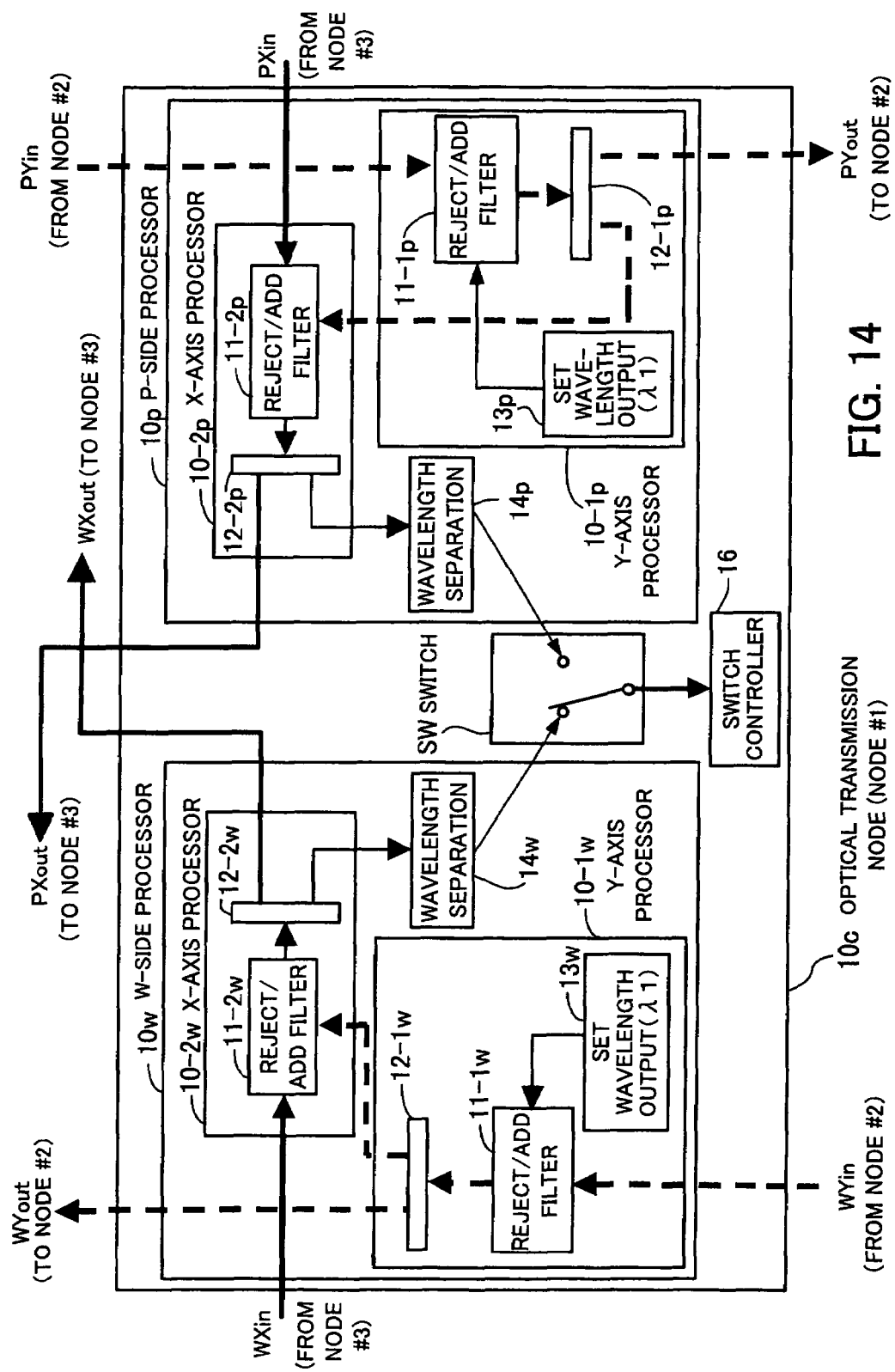
FIG. 14 shows the configuration of a redundant optical transmission node.
Figure 15:
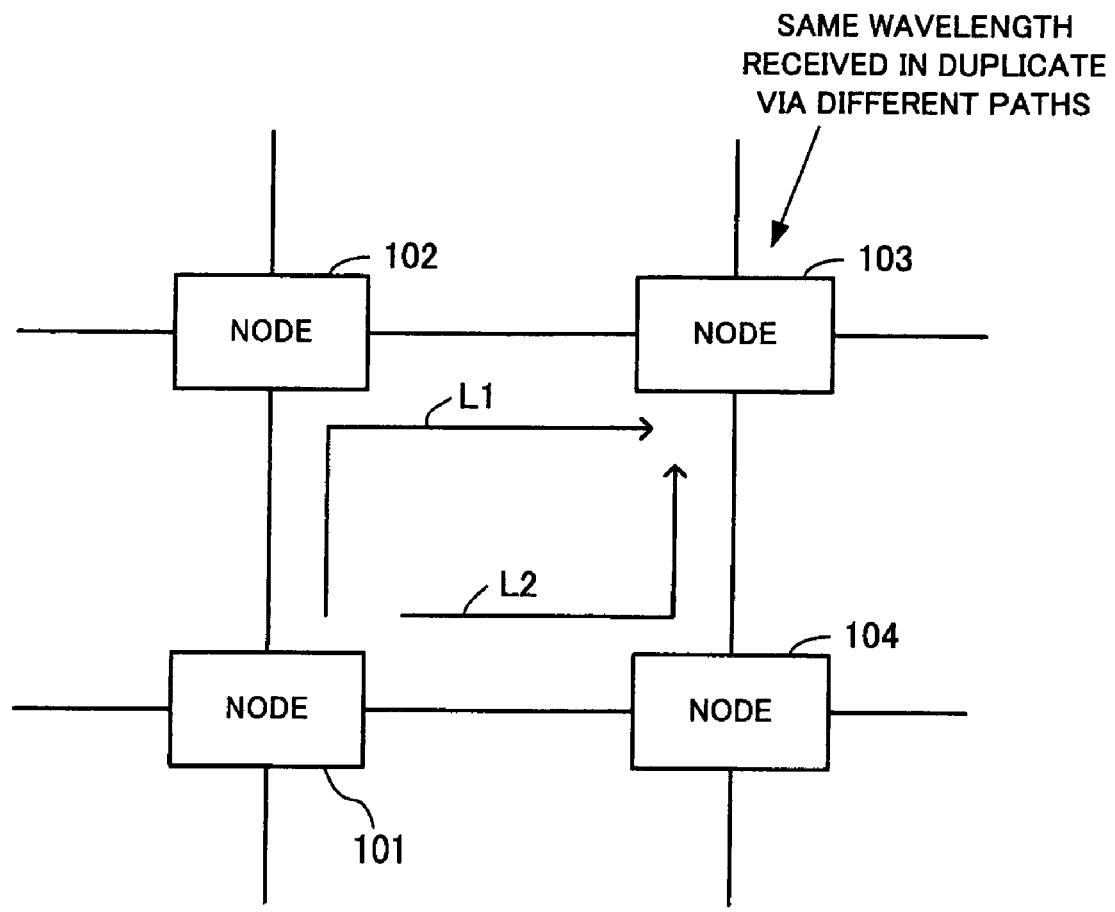
FIG. 15 illustrates duplicate reception of an optical signal.

Referring now to FIGS. 13 and 14, the optical network system 1 with a redundant configuration will be described. FIG. 13 exemplifies the configuration of a redundant optical network system, namely, the configuration of a two-dimensional torus type two-fiber optical network system.

The two fiber systems constitute working and protection systems, respectively, and optical signals are caused to propagate through the working and protection systems in opposite directions. In the figure, the optical fibers interconnecting the nodes are not illustrated in ring form for simplicity's sake. Also, out of the fibers indicated individually by three symbols in parentheses, those with the same symbols are connected to each other (W: Working; P: Protection).

FIG. 14 shows the configuration of a redundant optical transmission node. The optical transmission node 10c (corresponding to the node #1 on the two-dimensional torus network) comprises a working (W)-side processor 10w, a protection (P)-side processor 10p, a switch SW, and a switch controller 16.

The working-side processor 10w includes a Y-axis processor 10-1w, an X-axis processor 10-2w, and a wavelength separation filter 14w. The Y-axis processor 10-1w includes a set wavelength output unit 13w, a rejection-and-add filter 11-1w and a Y-axis splitter 12-1w, and the X-axis processor 10-2w includes a rejection-and-add filter 11-2w and an X-axis splitter 12-2w.

The protection-side processor 10p includes a Y-axis processor 10-1p, an X-axis processor 10-2p, and a wavelength separation filter 14p. The Y-axis processor 10-1p includes a set wavelength output unit 13p, a rejection-and-add filter 11-1p and a Y-axis splitter 12-1p, and the X-axis processor 10-2p includes a rejection-and-add filter 11-2p and an X-axis splitter 12-2p. These elements are already explained above, and therefore, description of their operation is omitted.

In accordance with a switching command from the switch controller 16, the switch SW switches between the working and protection systems. At the start of operation, the switch SW is connected to the working-side wavelength separation filter 14w.

The switch controller 16 receives the wavelength-separated optical signal through the switch SW and monitors its optical power. Also, the switch controller 16 has the same function as that of the receivers 15a and 15b shown in FIGS. 7 and 11. Accordingly, the switch controller 16 is capable of dropping the received wavelength-separated optical signal to be transmitted to the tributary connected to the optical transmission node 10c.

If an optical power disruption of the working system is detected while the wavelength-separated optical signal is received via the switch SW, the switch controller 16 sends a switching command to the switch SW. As a result, the switch SW is connected to the protection system, so that the optical signal dropped from the protection system is selected and output to the tributary (the fault avoidance scheme of O-UPSR (Optical Unidirectional Path Switched Ring) can be applied to this system).

The signals propagate through the working and protection systems in opposite directions. Thus, even if the two fibers are simultaneously disconnected at a certain location, the signal can be transmitted through the protection route to the node where the signal fails to reach through the working route, thereby avoiding disruption of the communication. Since this redundant configuration is applicable to three- and higher-dimensional networks, it is possible to implement high-redundancy n-dimensional torus type optical networks.

As described above, the optical network system 1 makes it possible to configure an optical network capable of directly routing optical signals without entailing multiple reception of identical signals, whereby the operability of optical communications can be improved.

In recent years, more and more massively parallel computer systems have come to use optical signals for the communication between computation nodes in the systems, in order to increase the capacity of communications between the computation nodes. In such applications, the computation nodes are in many cases physically connected in the form of a two- or three-dimensional torus so that a large number of nodes can be efficiently connected with one another. The optical network system 1 can be effectively applied to such networks to improve the performance of communications between the computation nodes.

The optical network system of the present invention makes it possible to configure an n-dimensional torus network having a plurality of rings in respective different directions. Each optical transmission node performs filtering by removing a wavelength identical with the set wavelength allocated thereto from a first optical signal propagated through a ring and adding the set wavelength to the first optical signal, and by removing, from a second optical signal propagated through a different ring, the wavelengths identical with those of the first optical signal and adding identical wavelengths to the second optical signal. After the filtering, the optical signal is split into two, one split signal being output to the outside through the same ring and the other split signal being made to join an optical signal propagate through a ring of a different direction so that the other split signal may be again filtered. Accordingly, an optical network capable of directly routing optical signals without entailing multiple reception of identical signals can be configured, making it possible to improve the operability of optical communications.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical network system enabling a plurality of nodes to send/receive optical signals to/from one another, comprising:

a plurality of optical transmission nodes to which respective different wavelengths are allocated, each of the optical transmission nodes including an $N_1$-axis processor, an $N_k$-axis processor, and a wavelength separation filter, the $N_1$-axis processor including a set wavelength output unit for outputting a set wavelength allocated to a local node, an $N_1$-axis filter for receiving an $N_1$-axis optical signal output from a different node and propagated through a ring of an $N_1$-axis direction, and performing filtering by removing a wavelength identical with the set wavelength from the $N_1$-axis optical signal and adding the set wavelength to the $N_1$-axis optical signal to generate a new $N_1$-axis optical signal, and an $N_1$-axis splitter for splitting the $N_1$-axis optical signal generated by the $N_1$-axis filter in two directions such that one split $N_1$-axis optical signal is output to outside through the ring of the $N_1$-axis direction while the other split $N_1$-axis optical signal is output to a point of confluence with an $N_2$-axis optical signal propagated inside the local node through a ring of an $N_2$-axis direction, the $N_k$-axis processor including an $N_k$-axis filter serving as a confluence point where an $N_k$-axis optical signal propagated through a ring of an $N_k$-axis direction (k=2, 3, . . . , n) joins an $N_{k-1}$-axis optical signal propagated through a ring of an $N_{k-1}$-axis direction, the $N_k$-axis filter receiving the $N_k$-axis optical signal output from a different node and propagated through the ring of the $N_k$-axis direction and the $N_{k-1}$-axis optical signal split inside the local node, and performing filtering by removing a wavelength identical with that of the $N_{k-1}$-axis optical signal from the $N_k$-axis optical signal and adding the wavelength of the $N_{k-1}$-axis optical signal to the $N_k$-axis optical signal to generate a new $N_k$-axis optical signal, and an $N_k$-axis splitter for splitting the $N_k$-axis optical signal generated by the $N_k$-axis filter in two directions such that one split $N_k$-axis optical signal is output to outside through the ring of the $N_k$-axis direction while the other split $N_k$-axis optical signal is output, if k<n, to a point of confluence with an $N_{k+1}$-axis optical signal propagated inside the local node through a ring of an $N_{k+1}$-axis direction, and, if k=n, to a location of wavelength separation, the wavelength separation filter receiving the $N_k$-axis optical signal output from the $N_k$-axis splitter and separating a desired wavelength from the received signal; and optical transmission media forming a plurality of rings of respective different $N_m$-axis directions (m=1, 2, . . . , n) and connecting the optical transmission nodes so as to constitute an n-dimensional torus network.

2. The optical network system according to claim 1, wherein the optical network system constitutes an n-dimensional torus network with rings in $N_m$-axis directions (m=1, 2, . . . , n), and the optical transmission nodes operate such that:

for m=1, the optical signal input from the ring of the $N_1$-axis direction is output in n directions starting from the ring of the $N_1$-axis direction to a ring of an $N_n$-axis direction, for 2≦m<n, the optical signal input from a ring of an $N_m$-axis direction is output in m directions starting from the ring of the $N_1$-axis direction to the ring of the $N_m$-axis direction, and for m=n, the optical signal input from the ring of the $N_n$-axis direction is output only to the ring of the $N_n$-axis direction.

3. The optical network system according to claim 1, wherein each of the optical transmission nodes has a redundant configuration including working and protection systems and further includes a switch for switching between the working and protection systems and a switch controller for controlling operation of the switch, and wherein the switch controller monitors power of the optical signal output from the wavelength separation filter associated with the working system and, on detecting a disruption of the power, causes the switch to switch from the working system to the protection system, to select an output signal from the wavelength separation filter associated with the protection system.

4. An optical network system enabling a plurality of nodes to send/receive optical signals to/from one another, comprising:

a plurality of optical transmission nodes to which respective different wavelengths are allocated, each of the optical transmission nodes including a Y-axis processor, an X-axis processor, and a wavelength separation filter, the Y-axis processor including a set wavelength output unit for outputting a set wavelength allocated to a local node, a Y-axis filter for receiving a Y-axis optical signal output from a different node and propagated through a ring of a Y-axis direction, and performing filtering by removing a wavelength identical with the set wavelength from the Y-axis optical signal and adding the set wavelength to the Y-axis optical signal to generate a new Y-axis optical signal, and a Y-axis splitter for splitting the Y-axis optical signal generated by the Y-axis filter in two directions such that one split Y-axis optical signal is output to outside through the ring of the Y-axis direction while the other split Y-axis optical signal is output to a point of confluence with an X-axis optical signal propagated inside the local node through a ring of an X-axis direction, the X-axis processor including an X-axis filter serving as the confluence point where the X-axis optical signal propagated through the ring of the X-axis direction joins the Y-axis optical signal propagated through the ring of the Y-axis direction, the X-axis filter receiving the X-axis optical signal output from a different node and propagated through the ring of the X-axis direction and the Y-axis optical signal split inside the local node, and performing filtering by removing a wavelength identical with that of the Y-axis optical signal from the X-axis optical signal and adding the wavelength of the Y-axis optical signal to the X-axis optical signal to generate a new X-axis optical signal, and an X-axis splitter for splitting the X-axis optical signal generated by the X-axis filter in two directions such that one split X-axis optical signal is output to outside through the ring of the X-axis direction while the other split X-axis optical signal is output to a location of wavelength separation, the wavelength separation filter receiving the X-axis optical signal output from the X-axis splitter and separating a desired wavelength from the received signal; and optical transmission media forming the rings of the respective different X- and Y-axis directions and connecting the optical transmission nodes so as to constitute a two-dimensional torus network.

5. The optical network system according to claim 4, wherein the optical network system constitutes a two-dimensional torus network with rings in X- and Y-axis directions, and the optical transmission nodes operate such that:

the optical signal input from the ring of the Y-axis direction is output in two directions through the rings of the X- and Y-axis directions, and the optical signal input from the ring of the X-axis direction is output only to the ring of the X-axis direction.

6. The optical network system according to claim 4, wherein each of the optical transmission nodes has a redundant configuration including working and protection systems and further includes a switch for switching between the working and protection systems and a switch controller for controlling operation of the switch, and wherein the switch controller monitors power of the optical signal output from the wavelength separation filter associated with the working system and, on detecting a disruption of the power, causes the switch to switch from the working system to the protection system, to select an output signal from the wavelength separation filter associated with the protection system.

7. An optical network system enabling a plurality of nodes to send/receive optical signals to/from one another, comprising:

a plurality of optical transmission nodes to which respective different wavelengths are allocated, each of the optical transmission nodes including a Z-axis processor, a Y-axis processor, an X-axis processor, and a wavelength separation filter, the Z-axis processor including a set wavelength output unit for outputting a set wavelength allocated to a local node, a Z-axis filter for receiving a Z-axis optical signal output from a different node and propagated through a ring of a Z-axis direction, and performing filtering by removing a wavelength identical with the set wavelength from the Z-axis optical signal and adding the set wavelength to the Z-axis optical signal to generate a new Z-axis optical signal, and a Z-axis splitter for splitting the Z-axis optical signal generated by the Z-axis filter in two directions such that one split Z-axis optical signal is output to outside through the ring of the Z-axis direction while the other split Z-axis optical signal is output to a point of confluence with a Y-axis optical signal propagated inside the local node through a ring of a Y-axis direction, the Y-axis processor including a Y-axis filter serving as the confluence point where the Y-axis optical signal propagated through the ring of the Y-axis direction joins the Z-axis optical signal propagated through the ring of the Z-axis direction, the Y-axis filter receiving the Y-axis optical signal output from a different node and propagated through the ring of the Y-axis direction and the Z-axis optical signal split inside the local node, and performing filtering by removing a wavelength identical with that of the Z-axis optical signal from the Y-axis optical signal and adding the wavelength of the Z-axis optical signal to the Y-axis optical signal to generate a new Y-axis optical signal, and a Y-axis splitter for splitting the Y-axis optical signal generated by the Y-axis filter in two directions such that one split Y-axis optical signal is output to outside through the ring of the Y-axis direction while the other split Y-axis optical signal is output to a point of confluence with an X-axis optical signal propagated inside the local node through a ring of an X-axis direction, the X-axis processor including an X-axis filter serving as the confluence point where the X-axis optical signal propagated through the ring of the X-axis direction joins the Y-axis optical signal propagated through the ring of the Y-axis direction, the X-axis filter receiving the X-axis optical signal output from a different node and propagated through the ring of the X-axis direction and the Y-axis optical signal split inside the local node, and performing filtering by removing a wavelength identical with that of the Y-axis optical signal from the X-axis optical signal and adding the wavelength of the Y-axis optical signal to the X-axis optical signal to generate a new X-axis optical signal, and an X-axis splitter for splitting the X-axis optical signal generated by the X-axis filter in two directions such that one split X-axis optical signal is output to outside through the ring of the X-axis direction while the other split X-axis optical signal is output to a location of wavelength separation, the wavelength separation filter receiving the X-axis optical signal output from the X-axis splitter and separating a desired wavelength from the received signal; and optical transmission media forming the rings of the respective different X-, Y- and Z-axis directions and connecting the optical transmission nodes so as to constitute a three-dimensional torus network.

8. The optical network system according to claim 7, wherein the optical network system constitutes a three-dimensional torus network with rings in X-, Y- and Z-axis directions, and the optical transmission nodes operate such that:

the optical signal input from the ring of the Z-axis direction is output in three directions through the rings of the X-, Y- and Z-axis directions, the optical signal input from the ring of the Y-axis direction is output in two directions through the rings of the Z- and Y-axis directions, and the optical signal input from the ring of the X-axis direction is output only to the ring of the X-axis direction.

9. The optical network system according to claim 7, wherein each of the optical transmission nodes has a redundant configuration including working and protection systems and further includes a switch for switching between the working and protection systems and a switch controller for controlling operation of the switch, and wherein the switch controller monitors power of the optical signal output from the wavelength separation filter associated with the working system and, on detecting a disruption of the power, causes the switch to switch from the working system to the protection system, to select an output signal from the wavelength separation filter associated with the protection system.

* * * * *